United States Patent
Ylonen et al.

(10) Patent No.: US 10,091,239 B2
(45) Date of Patent: Oct. 2, 2018

(54) AUDITING AND POLICY CONTROL AT SSH ENDPOINTS

(71) Applicants: Tatu J. Ylonen, Espoo (FI); Samuel Douglas Lavitt, Jarvenpaa (FI)

(72) Inventors: Tatu J. Ylonen, Espoo (FI); Samuel Douglas Lavitt, Jarvenpaa (FI)

(73) Assignee: SSH COMMUNICATIONS SECURITY OYJ, Helsinki (FI)

( * ) Notice: Subject to any disclaimer, the term of this patent is extended or adjusted under 35 U.S.C. 154(b) by 712 days.

(21) Appl. No.: 13/749,005

(22) Filed: Jan. 24, 2013

(65) Prior Publication Data

US 2013/0191631 A1 Jul. 25, 2013

Related U.S. Application Data

(60) Provisional application No. 61/589,888, filed on Jan. 24, 2012.

(51) Int. Cl.
*H04L 29/06* (2006.01)

(52) U.S. Cl.
CPC ........ *H04L 63/166* (2013.01); *H04L 63/1483* (2013.01); *H04L 63/16* (2013.01); *H04L 63/164* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 5,884,025 A | 3/1999 | Baehr et al. | |
| 5,978,475 A | 11/1999 | Schneier et al. | |
| 6,393,568 B1 | 5/2002 | Ranger et al. | |
| 6,629,143 B1 | 9/2003 | Pang | |
| 6,636,838 B1 | 10/2003 | Perlman et al. | |
| 6,701,432 B1 | 3/2004 | Deng et al. | |
| 7,275,102 B2 | 9/2007 | Yeager et al. | |
| 7,480,655 B2 | 1/2009 | Thomas et al. | |
| 7,577,838 B1 | 8/2009 | Rossmann | |
| 8,130,768 B1 | 3/2012 | Ahrens et al. | |
| 8,364,666 B1 | 1/2013 | Katzir | |
| 8,612,971 B1 | 12/2013 | Fitzgerald et al. | |
| 8,683,052 B1 | 3/2014 | Brinskelle | |
| 8,806,020 B1 | 8/2014 | Lewis et al. | |
| 8,856,869 B1 | 10/2014 | Brinskelle | |
| 8,856,910 B1 * | 10/2014 | Rostami-Hesarsorkh ................ H04L 63/1408 713/153 |

(Continued)

FOREIGN PATENT DOCUMENTS

| | | |
|---|---|---|
| WO | WO-03038622 A1 | 5/2003 |
| WO | WO-2007/023465 A1 | 3/2007 |

OTHER PUBLICATIONS

Balabit IT, "Balabit Shell Control Box 2.0.2 Administrator Guide", 4th ed., Apr. 9, 2010, Balabit IT Security, p. 1-243.*
Balabit IT, "PCI compliance and forensics in auditing remote server access", 3rd ed, Nov. 26, 2010, Balabit IT Security, p. 1-23.*

(Continued)

*Primary Examiner* — Jeffery Williams
(74) *Attorney, Agent, or Firm* — Robert P. Michal, Esq.; Carter, DeLuca, Farrell & Schmidt, LLP

(57) ABSTRACT

SSH sessions and other protocol sessions (e.g., RDP) may be audited using an interceptor embedded within an SSH server or other protocol server. Operations performed over an SSH connection may be controlled, including controlling what files are transferred.

17 Claims, 9 Drawing Sheets

(56) References Cited

U.S. PATENT DOCUMENTS

| | | | |
|---|---|---|---|
| 8,869,259 B1 | 10/2014 | Udupa et al. | |
| 8,949,825 B1 | 2/2015 | Fitzgerald et al. | |
| 9,531,754 B2* | 12/2016 | Alon | H04L 63/20 |
| 2002/0131404 A1 | 9/2002 | Mehta et al. | |
| 2002/0178271 A1 | 11/2002 | Graham et al. | |
| 2003/0084279 A1 | 5/2003 | Campagna | |
| 2004/0015725 A1* | 1/2004 | Boneh | H04L 63/166 |
| | | | 713/160 |
| 2004/0243349 A1 | 12/2004 | Greifeneder et al. | |
| 2005/0050362 A1 | 3/2005 | Peles | |
| 2005/0055578 A1 | 3/2005 | Wright et al. | |
| 2005/0086300 A1 | 4/2005 | Yeager et al. | |
| 2005/0138426 A1* | 6/2005 | Styslinger | H04L 63/0281 |
| | | | 726/4 |
| 2006/0123226 A1 | 6/2006 | Kumar et al. | |
| 2006/0161966 A1 | 7/2006 | Nagampalli et al. | |
| 2006/0212270 A1 | 9/2006 | Shiu et al. | |
| 2007/0016952 A1 | 1/2007 | Stevens | |
| 2007/0033643 A1 | 2/2007 | Rossi et al. | |
| 2008/0052395 A1 | 2/2008 | Wright et al. | |
| 2008/0059474 A1 | 3/2008 | Lim | |
| 2008/0060080 A1 | 3/2008 | Lim | |
| 2008/0229025 A1 | 9/2008 | Plamondon | |
| 2009/0172774 A1* | 7/2009 | Koti | H04L 63/0218 |
| | | | 726/1 |
| 2009/0220080 A1 | 9/2009 | Herne et al. | |
| 2009/0292930 A1 | 11/2009 | Marano et al. | |
| 2009/0327718 A1 | 12/2009 | Hirai | |
| 2011/0314270 A1 | 12/2011 | Lifliand et al. | |
| 2012/0297043 A1* | 11/2012 | Davis | H04L 45/60 |
| | | | 709/223 |
| 2013/0173782 A1 | 7/2013 | Ragutski et al. | |
| 2014/0317409 A1* | 10/2014 | Bartok | H04L 63/06 |
| | | | 713/171 |

OTHER PUBLICATIONS

Balabit IT, "The evolution of the firewall", version 1.0, Jun. 26, 2006, Balabit IT Security, p. 1-11.*
Balabit IT, "SSH proxying and 4-eyes authorization", version 1.2, May 12, 2006, Balabit IT Security, p. 1-9.*
Balabit IT, "Proxying secure channels—the Secure Socket Layer", version 1.0, Jun. 7, 2006, Balabit IT Security, p. 1-12.*
Ylonen et al., "The Secure Shell (SSH) Transport Layer Protocol", RFC. 4253, 2006, p. 1-32.*
Office Action issued in U.S. Appl. No. 14/580,308 dated Apr. 29, 2016 (16 pages).
International Search Report issued by the National Board of Patents and Registration of Finland acting as the International Searching Authority in relation to International Application No. PCT/FI2013/050076 dated Apr. 16, 2013 (5 pages).
Written Opinion of the International Searching Authority issued by the National Board of Patents and Registration of Finland acting as the International Searching Authority in relation to International Application No. PCT/FI2013/050076 dated Apr. 16, 2013 (8 pages).
Tectia Corporation, "Auditing and Monitoring", [retrieved on Mar. 14, 2013]. Retrieved from the Internet Archive: <URL: http://archive.orgiweb/web.php with search term http://ssh.com/index.php/solutions-overview/auditing-and-monitoring.html>, website archived on Nov. 30, 2011 (2 pages).
Extended European Search Report issued by the European Patent Office in relation to European Patent Application No. 13740858.9 dated Mar. 4, 2015 (6 pages).
Communication pursuant to Article 94(3) EPC issued by the European Patent Office in relation to European Patent Application No. 13740858.9 dated Jan. 25, 2018 (5 pages).
Feb. 28, 2011 (Feb. 28, 2011), XP002736392, Retrieved from the Internet: URL:https://live.paloaltonetworks.com/docs /DOC-1758 [retrieved on Feb. 24, 2015] * the whole document* (7 pages).

* cited by examiner

AUDITING AND POLICY CONTROL AT SSH ENDPOINTS

CROSS-REFERENCE TO RELATED APPLICATIONS

This application claims the benefit of the pending provisional U.S. patent application 61/589,888, filed Jan. 24, 2012.

This application is related to U.S. patent application Ser. No. 13/748,693, filed on the same day herewith (Jan. 24, 2013).

This application is related to U.S. patent application Ser. No. 13/748,797, filed on the same day herewith (Jan. 24, 2013).

INCORPORATION-BY-REFERENCE OF MATERIAL SUBMITTED ON ATTACHED MEDIA

Not Applicable

TECHNICAL FIELD

The invention relates to security in computer networks and computing systems, particularly to auditing sessions at SSH protocol clients and servers.

BACKGROUND OF THE INVENTION

Large enterprises have many thousands of server computers and tens of thousands or more of individual computing devices. Such organizations also typically use hundreds or thousands of different computer software applications in the course of their business, and have many, often hundreds of system administrators installing, maintaining, operating, upgrading, and otherwise administering these computers and applications.

Many applications provide different access or privilege levels for users. For example, a financial application might have privileged accounts that can be used to configure the system (e.g., select currencies used, create or delete accounts) and normal accounts that can only be used for day-to-day operations or data entry. For computer systems, there are typically normal user applications that are only used for running various application software, and administrator accounts (such as the root account in Unix/Linux or Administrator account and Domain Administrator account in Windows) that can be used to install, modify, or delete software on the system or access hardware (e.g., disk drives) directly, bypassing normal security and protection mechanisms on the computer (in practice, such accounts frequently permit kernel-level or operating system level access by allowing the installation of new device drivers or upgrading the operating system kernel). Given the large powers of certain administrator accounts, it is also possible to hide one's actions or insert hidden subvertive code into the system through such accounts.

Given the high number of administrators and the ability of some accounts to subvert even the operating system, it is important for organizations to monitor and audit access to and use of privileged accounts. This is important even for many medium-level privileged accounts where such auditing might still be required by regulations or good corporate governance policies. Furthermore, some applications might be so critical that all access to them should be audited, while others might ideally require real-time auditing and control from more than one person while performing administrative actions.

Several commercial products exist for controlling and auditing actions by administrators.

The PowerBroker product from BeyondTrust, Inc. permits fine-grained control and auditing of certain administrative actions.

The Xsuite products from Xceedium permit monitoring of SSH (Secure Shell) and RDP (Remote Desktop Protocol) sessions by requiring all administrative connections to be made through a centralized server, which decides which administrative interfaces a user can connect to and audits the actions performed by the administrator. It has access to the plaintext of even encrypted connections by making the connection from the centralized server and providing an HTTP-based web connection to the administrator. A shortcoming of the solution is that it forces administrators to use the user interface and tools provided by the solution; it is thus intrusive and changes the way administrators need to work.

The Privileged Session Management Suite from CyberArk has similar capabilities and functionality as the Xceedium product, and suffers from similar shortcomings.

The Shell Control Box from Balabit also permits monitoring and auditing of SSH, RDP, VNC (Virtual Network Computing), and certain other types of sessions. While it can be operated in Bastion Mode, which is somewhat similar to the aforementioned products, it can also act as an intermediate device in the network between the administrative user and the computer running the application to which the administrative connection is. It performs a man-in-the-middle attack on the cryptography, which enables it to decrypt, inspect, and record even the contents of encrypted communications protocols. However, performing such attack smoothly requires that the intermediate device has a copy of the private key of the host being connected to, called destination host (for SSH), or a private key and certificate for the destination host (for, e.g., RDP). If the host key of the destination host is changed (it is prudent security practice to change any keys regularly), the key must be changed also on the intermediate device. When there are many hosts and many applications, this becomes very cumbersome. Furthermore, such keys may also be stored in, e.g., SSH clients, resulting in very confusing error/warning messages to end users when the keys are changed.

The Shell Control Box is frequently installed next to a firewall and stores all audit data on the Shell Control Box itself. Sometimes it is installed next to the server. When there are multiple firewalls or multiple servers to protect (possibly at different sites in widely separated geographic locations), logs from multiple users will remain at each Shell Control Box and since sensitive user data (including passwords) is stored at each device, compromise of even a single device may result in compromise of sensitive passwords. Centralized searches from multiple Shell Control Box installations are not possible.

The SSH protocol is described in the Internet Engineering Task Force (IETF) standards RFC 4250 The Secure Shell (SSH) Protocol Assigned Numbers, RFC 4251 The Secure Shell (SSH) Protocol Architecture, RFC 4252 The Secure Shell (SSH) Authentication Protocol, RFC 4253 The Secure Shell (SSH) Transport Layer Protocol, and RFC 4254 The Secure Shell (SSH) Connection Protocol. The original protocol was invented and developed by one of the present inventors in 1995-1999, and then standardized by the IETF.

The Secure Shell (SSH) protocol and related client and server software applications are now included in nearly all Unix and Linux versions, such as IBM AIX, HP-UX, Solaris, Red Hat, SUSE, Ubuntu, etc. Popular implementations of the SSH protocol include the open source OpenSSH, which is based on the present inventor's free SSH version 1.12 from 1995, and the commercial Tectia SSH client and server from SSH Communications Security (Tectia Corporation).

The Secure Sockets Layer (SSL) protocol is described in RFC 6101. Its newer version, Transport Layer Security (TLS) protocol is described in RFC 5246.

The Remote Desktop Protocol is based on, and an extension of, the ITU T.120 family of protocols. It is described in detail in Microsoft documentation, available with the Microsoft Developer Network product, under the entry [MS-RDPBCGR]: Remote Desktop Protocol: Basic Connectivity and Graphics Remoting Specification, Microsoft Corporation, Dec. 14, 2011.

An objective of the present invention is to implement auditing and control of SSH connections and/or file transfers in an SSH client or SSH server.

BRIEF SUMMARY OF THE INVENTION

The invention is not intended to be limited to embodiments that meet any particular objective or provide any particular benefit mentioned herein; in fact, many of the aspects and elements of the invention described herein have independent useful and inventive applications, and may be incorporated into an apparatus, method, computer software, or data structure or another aspect or embodiment of the invention to form a new aspect of the invention. "An embodiment" or "one embodiment" may refer to one exemplary embodiment or class of embodiments, not necessarily all embodiments and possibly different embodiments in each case. In this specification "audit data" generally, though not necessarily, means the full contents of a session (substantially all packets transmitted in a session) and optionally associated metadata.

An aspect of the invention is a system for capturing, decrypting (via a man-in-the-middle attack or otherwise), authenticating, authorizing, controlling, auditing, and/or DLP-controlling connections to applications and/or computers. One possible embodiment of the invention is an apparatus, and components of the system may be embodied in one or more apparatuses. Another embodiment of the invention is computer program product on a computer-readable medium that can be executed by one or more processors and that may be installed in one or more firewalls, network appliances, dedicated computers, virtual machines, or other data processing systems. A virtual machine is considered a computing device herein. Yet another embodiments of the invention include methods for capturing, decrypting, authenticating, authorizing, controlling, auditing, and/or DLP-controlling connections to applications and/or computers.

The invention comprises many aspects and elements which may be combined in whole or in part to form new aspects and embodiments of the invention.

An aspect of the invention is capturing a session by a firewall plugin installed in a firewall.

An aspect of the invention is capturing a session by an interceptor inside an SSH (Secure Shell Protocol) server.

An aspect of the invention is capturing a session by an interceptor inside an SSH client.

An aspect of the invention is capturing a session by an interceptor inside an RDP (Remote Desktop Protocol) server.

An aspect of the invention is capturing a session by an interceptor as part of a host-based firewall.

An aspect of the invention is performing man-in-the-middle capture for SSH using key escrow information sent by an SSH client or server.

An aspect of the invention is performing man-in-the-middle capture for SSH without re-constructing at least 50% of all packets in the session.

An aspect of the invention is sending session audit data to an audit server from the interceptor, where the audit server for storing recorded sessions and interceptor reside on different physical or virtual hosts.

An aspect of the invention is sending substantially all data exchanged in a session to an audit server, where the data is either decrypted before sending or the data is sent with information required for decrypting it.

An aspect of the invention is sending encoded policy from an audit server to the interceptor, capturing a session by the interceptor, and using said encoded policy by the interceptor in deciding whether the session or action therein is authorized.

An aspect of the invention is requesting a private key from a private key server for the purpose of performing a man-in-the-middle attack on an encrypted session. (It should be noted that even though it is called an "attack" for historical reasons, here it is simply used as a technique for obtaining plaintext of a session among co-operating parties.)

An aspect of the invention is sending information relating to a particular encrypted session to a private key server, causing a cryptographic operation to be performed by the private key server using a private key and said information, receiving results of the private key operation from the private key server, and performing a man-in-the-middle attack on the session using the results.

An aspect of the invention is receiving a connection from an interceptor, authenticating the interceptor, receiving a request to perform a cryptographic operation using a private key with information relating to a particular session, performing the requested private key operation, and sending the results of the private key operation back to the interceptor.

An aspect of the invention is decrypting data belonging to a session in an interceptor, sending the decrypted data to a Data Loss Prevention system using the iCAP protocol or other suitable protocol, and based on a value returned by the Data Loss Prevention System, either disconnecting the connection or allowing the data to go through.

An aspect of the invention is decrypting data belonging to a session in an interceptor, sending the decrypted data to an Anti-Virus/Malware checker, and based on a value returned by the Anti-Virus/Malware checker, permitting or denying the data transfer.

An aspect of the invention is the audit server receiving audit data relating to a session from an interceptor, the audit server sending said data to a Data Loss Prevention System, and in response to the Data Loss Prevention system informing the audit server that transmitting the data is not allowed, causing the interceptor to terminate the connection, flag the session, and/or trigger an alarm.

An aspect of the invention is suspending a session by an interceptor, informing a policy server by the interceptor that a new session to a particular service (service here meaning computer and/or application) is being requested (optionally with information about the requesting user), waiting for the policy server to authorize the connection, and the interceptor allowing the session to continue after receiving authorization from the policy server.

An aspect of the invention is receiving information from an interceptor about a new session and the service being requested, determining that 4-eyes supervision is required for the session, waiting for a user different from the user requesting the new session to authorize the new session, and when such authorization is received, authorizing the interceptor to allow the session to continue.

An aspect of the invention is receiving a connection for a new session by an interceptor, receiving the identity of the user under whose authorization the session is to be performed, suspending the session, sending the user's identity to a policy server, waiting for authorization from the policy server, and in response for receiving such authorization, allowing the session to continue while being monitored.

An aspect of the invention is receiving a connection for a new session from a client by an interceptor, receiving the identity of the user under whose authorization the session is to be performed, authenticating the user to the requested service, and in addition to receiving notification of successful authentication from the service, the interceptor requesting a second authentication from the client, and only notifying the client of successful authentication if also this second authentication is successful.

An aspect of the invention is the interceptor obtaining information about a service to which a connection request is received from a directory (e.g., an LDAP directory, Kerberos, or Microsoft Active Directory), and determining whether the connection is to be permitted without obtaining connection to an audit or policy server based on the information obtained from the directory.

An aspect of the invention is a method for auditing SSL or TLS (e.g., HTTPS and RDP) sessions comprising: providing a software module on a computer having the private key corresponding to a certificate used by the server for SSL authentication; performing a man-in-the-middle attack in a network device/computer through which packets belonging to the SSL session are routed, the man-in-the-middle attack including identifying which server the SSL session was originally destined to; identifying a server that has access to the private key corresponding to a certificate for the destination server; contacting said software module during the man-in-the-middle attack for performing a private key operation using a private key that said software module provides access to. In a variant aspect, the software module provides a copy of a private key to a module performing man-in-the-middle attacks, and the man-in-the-middle attack uses a provided local copy of a private key to perform the man-in-the-middle attack.

An aspect of the invention is loading a software module for auditing encrypted sessions onto a firewall using an administration interface. Another aspect is a firewall-installable software module stored on tangible computer-readable medium for recording substantially all contents of an encrypted session in a form or with information that permits substantially all contents of the session to be later analyzed in decrypted form.

An aspect of the invention is adding of new analysis methods for encrypted connections without modifying interceptors.

An aspect of the invention is obtaining the private host key for a computer and copying the host key to the audit server.

An aspect of the invention is receiving, by a private key server, a request to perform a cryptographic operation with information identifying the destination computer for the session that the request relates to, establishing a connection to the destination server, and causing the sending a request to the destination server to perform the private key operation relating to the session, together with credentials that tell the destination server that the request is authorized by a private key server.

An aspect of the invention is causing the sending of a public key corresponding to a private key using which the interceptor can have a cryptographic operation performed to a client as the public key of a service the client can connect to.

An aspect of the invention is receiving key escrow data from a co-operative client or server by an interceptor, and using the key escrow data to audit a session without decrypting it at the interceptor by sending the key escrow data and the encrypted session to an audit server.

An aspect of the invention is receiving key escrow data from a co-operative client or server by an interceptor, using the key escrow data to decrypt the session, and sending an original encrypted packet belonging to the session to the destination host without re-encrypting it.

An aspect of the invention is caching aspects of recently made policy decisions in the interceptor to speed up later policy decisions by the interceptor.

An aspect of the invention is configuring the interceptor with more than one audit server address, and in response to one of the configured audit servers not responding, connecting to another audit server. Correspondingly for private key servers and policy servers.

An aspect of the invention is deleting passwords from audit data before storing audit data in its long-term storage format.

An aspect of the invention is performing OCR (Optical Character Recognition) for an RDP (Remote Desktop Protocol) session or other protocol session transmitting text in graphical format in an interceptor and sending text resulting from the OCR to a centralized audit server. Another aspect includes using such text for policy decisions, such as Data Loss Prevention or alerts.

An aspect of the invention is performing OCR (Optical Character Recognition) for an RDP (Remote Desktop Protocol) session or other protocol session transmitting text in graphical format in an audit server and indexing the resulting text for later lookups. Another aspect includes using such text for policy decisions, such as Data Loss Prevention or alerts.

An aspect of the invention is storing different connections relating to an SSH session as separate audit log entries in an audit server and making them separately viewable in the audit server user interface.

An aspect of the invention is interpreting the contents of a port forwarding connection within an encrypted session (e.g., an SSH protocol session or an IPSec session) as another encrypted session (e.g., SSH, RDP, or VNC session), and performing a man-in-the-middle attack on that other SSH session to decrypt its contents.

An aspect of the invention is interpreting the contents of a logical channel in an SSH protocol session as a file transfer channel and enforcing policy about which files may be accessed on any file access operations using that channel.

An aspect of the invention is a computer-readable memory system comprising an audit data file for a session wherein the session data is encrypted, and a different encryption key is used for encrypting passwords than other data.

An aspect of the invention is the interceptor obtaining an encryption key for the audit server and encrypting audit data sent to the audit server using said keys.

An aspect of the invention is the interceptor sending more than 50% of audit data to the audit server encrypted using the same encryption keys used for the session on either side of the interceptor without encrypting that data using other keys for transmission to the audit server.

An aspect of the invention is sharing a single connection to an audit server for multiple sessions, comprising sending a notification about a new session to the audit server, and including with audit data packets an identifier for the session that it belongs to, and sending a notification to the audit server when a session is terminated.

An aspect of the invention is extracting the name of a transmitted file by the interceptor or the audit server and saving in a session recording only the name of the accessed file even though the entire contents of the file were transmitted. In another embodiment, a cryptographic hash value of the file contents is stored in addition to the name.

An aspect of the invention is detecting when more than one interceptor has access to the same session and causing it to be audited and/or stored only once.

A further aspect of the invention is the audit server computing a cryptographic hash value of the contents of a file or web page transferred using a connection, checking if a file with that hash value has already been transferred, and if so, saving only a reference to the previously stored file (e.g., its hash value) in the audit log instead of the full contents of the file.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE SEVERAL VIEWS OF THE DRAWING(S)

FIG. 1 illustrates a firewall proxy embodiment of an interceptor for intercepting, authorizing, controlling, and auditing access to applications/computers through the firewall. An interceptor may also be implemented, e.g., within an application server (e.g., SSHD), within a host-based firewall, or in a virtual machine firewall between virtual machines on the same (or distinct) physical hardware (an example of such a virtual machine firewall would be the VMWare vShield product).

DETAILED DESCRIPTION OF THE INVENTION

Figure 2:
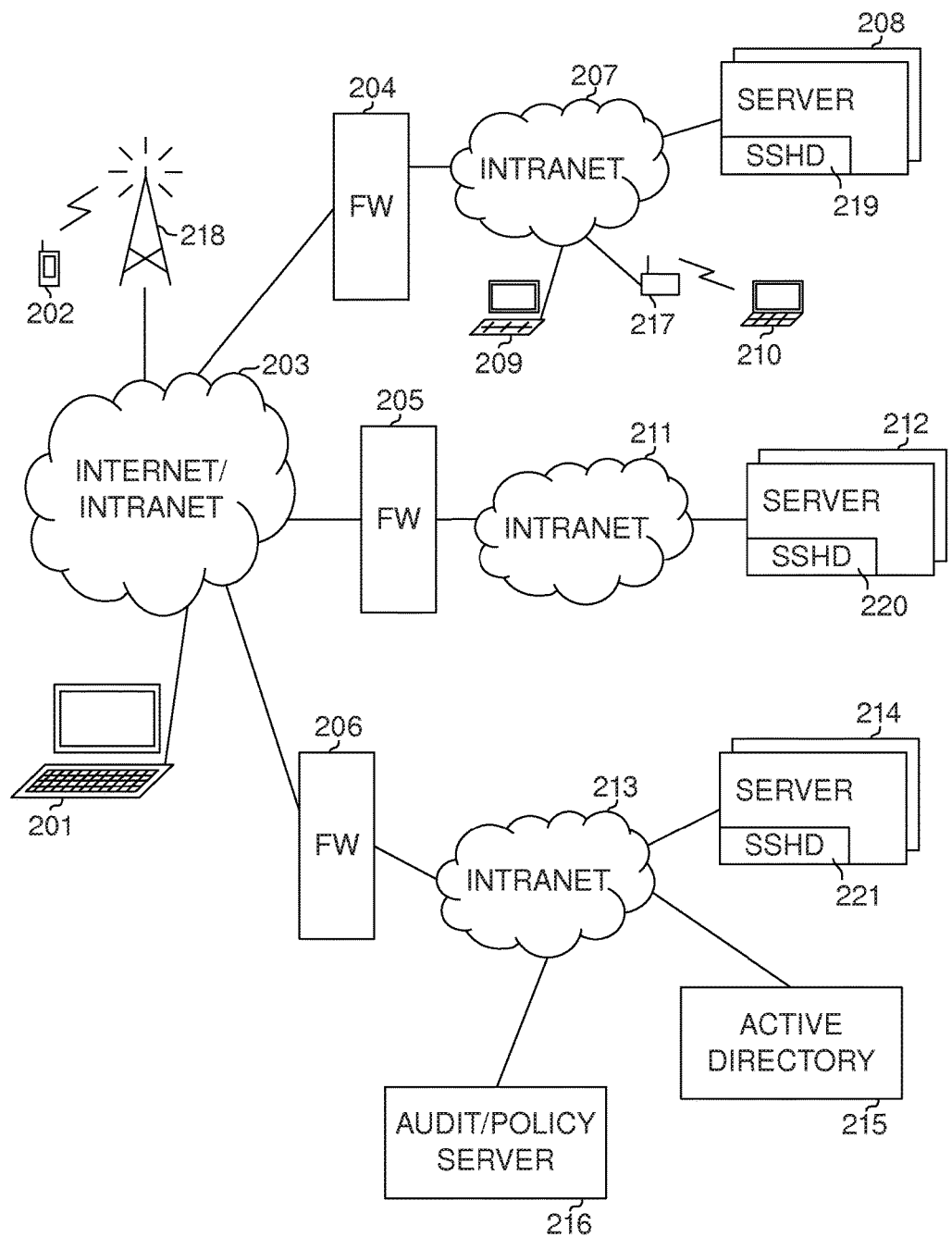
FIG. 2 illustrates a multi-site enterprise network with a firewall protecting access to each site (and frequently also providing VPN (Virtual Private Network) connections between sites).

FIG. 2 illustrates an embodiment in an enterprise network with multiple sites. 201 illustrates a (client) computer connected to the Internet or an intranet 203 (which is preferably an IPv4 or IPv6 network, but could also use other protocols). The computer means a computing device that comprises software for initiating a session with a server (typically using SSH (Secure Shell), RDP (Remote Desktop), VNC, or HTTPS protocol, though other protocols could also be used). 202 illustrates a (client) computer that has a wireless connection to the network via a base station 218 (the wireless network could be, e.g., WLAN, GSM/EDGE/HSPA, 3G, 4G, or WiMAX network, including optical and near-field networks).

The figure includes multiple sites for the enterprise. Each site has a firewall 204, 205, 206; the firewalls advantageously comprising an interceptor (which may actually be in the firewall or near the firewall in the network, though interceptors could also be placed elsewhere, such as in front of servers). Behind each firewall is an intranet or LAN 207, 211, 213 for the site (though in some cases it could be nearly as large as the Internet and include multiple sites). Connected to each intranet may be one or more servers 208, 212, 214 that accept audited sessions (here, server encompasses both the notion of a (possibly virtual) computer and software for processing incoming connections), such as an SSH protocol server sshd 219, 220, and 221. Connected to each intranet may be one or more clients 209 (a computer with fixed LAN connection), 210 (a computer with wireless connection through a base station 217).

The enterprise network in this embodiment also comprises an Active Directory Server 215 used for obtaining user information and an audit/policy/private key server 216 (in many organizations, there are multiple such servers, and virtual directories may be used for combining data from multiple Active Directory or LDAP servers and other sources). In this embodiment all these functions are implemented using a single server; however, in other embodiments each could be implemented by one or more dedicated or virtual machines. Multiple machines may be used for the same function for scalability or high availability reasons (implementing scalability and high availability is well understood and documented in the art). There could also be, e.g., one or more separate database server machines in some embodiments.

The audit server(s), policy server(s), and/or private key server(s) may be separate computing devices (running one or more computer program products implementing certain functionality) or may reside on the same computing device as one or more programs or computer-executable instructions or computational logic.

Figure 1:
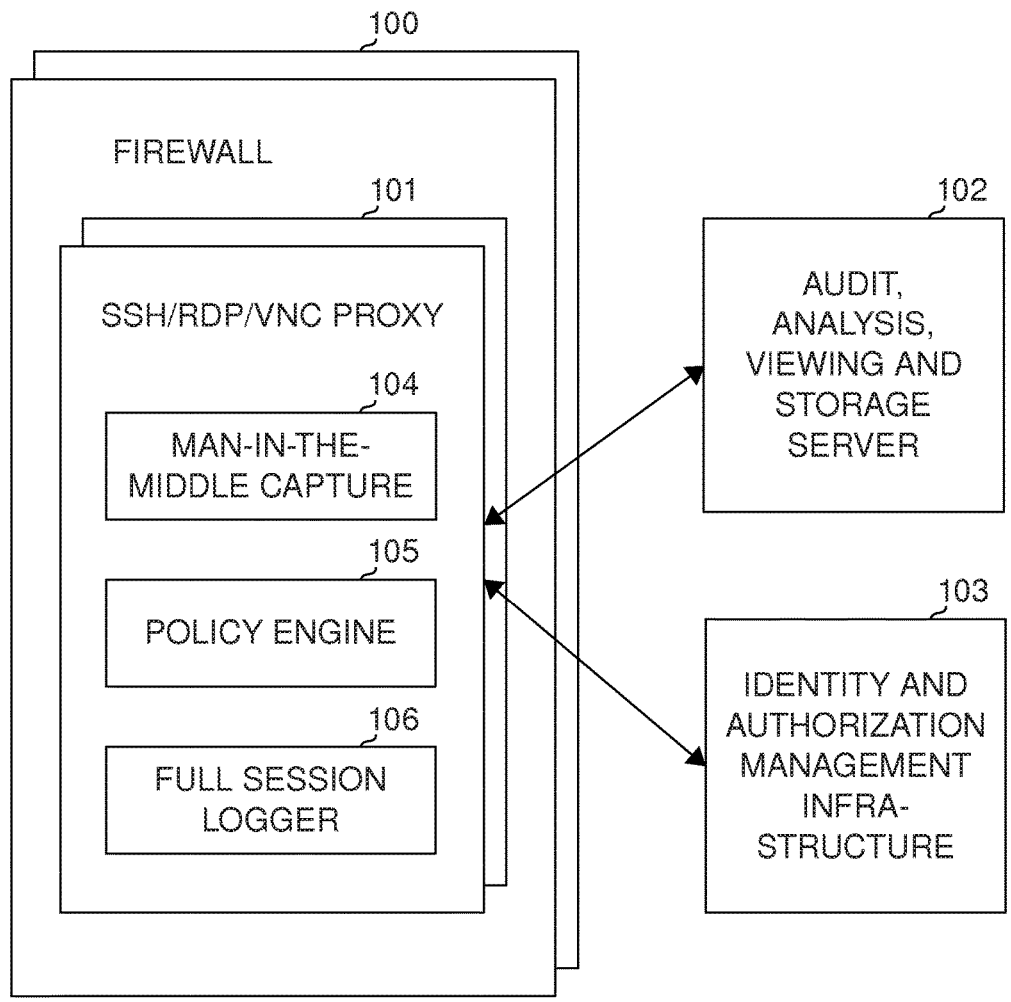

FIG. 1 illustrates an embodiment of an interceptor in a firewall 100. An interceptor comprises one or more protocol proxies and other supporting components. Each firewall may contain one or more protocol proxies 101, such as an SSH proxy, RDP proxy, VNC proxy, FTP/S (FTP over SSL/TLS) proxy, or HTTPS (HTTP over SSL/TLS) proxy. A proxy may also implement more than one protocol. Each proxy contains a man-in-the-middle component 104 for performing man-in-the-middle attack (or key escrow or other suitable method) for obtaining access to the plaintext of the session; a policy engine 105 for deciding which users may connect to which services and/or which actions each user may perform with each service; and a full session logger 106 for sending substantially all (or at least 50%) of a session to an audit server, though in some embodiments sending may be more selective, such as only sending information about which files are accessed through the session, without actually sending file contents.

The interceptor communicates with an audit, analysis, viewing, and storage server 102 (though these various functions of the servers may actually be implemented by more than one machine).

The interceptor also communicates with an identity and authorization management infrastructure 103, such as Active Directory, LDAP, NIS, or a database containing user accounts and authorization information. There may be more than one such infrastructure or server.

Some protocols, such as SSL/TLS, can be used either with perfect forward secrecy or without perfect forward secrecy. When used with perfect forward secrecy, a man-in-the-middle attack may be required to obtain access to the encrypted contents of the communication, and the plaintext cannot be obtained from a recording of the encrypted session even if the server's private key is obtained at a later time. When used without perfect forward secrecy, the encrypted session may be recorded without performing a man-in-the-middle attack, and access to its plaintext can still be obtained at a later time provided access to the server's private key (no man-in-the-middle attack is required for obtaining access to plaintext of such sessions). Both modes are available with SSL/TLS, but SSL and TLS are usually used without perfect forward secrecy at the time of this writing. The IPSec protocol can optionally provide perfect forward secrecy. Commonly used SSH implementations always provide perfect forward secrecy.

Figure 3:
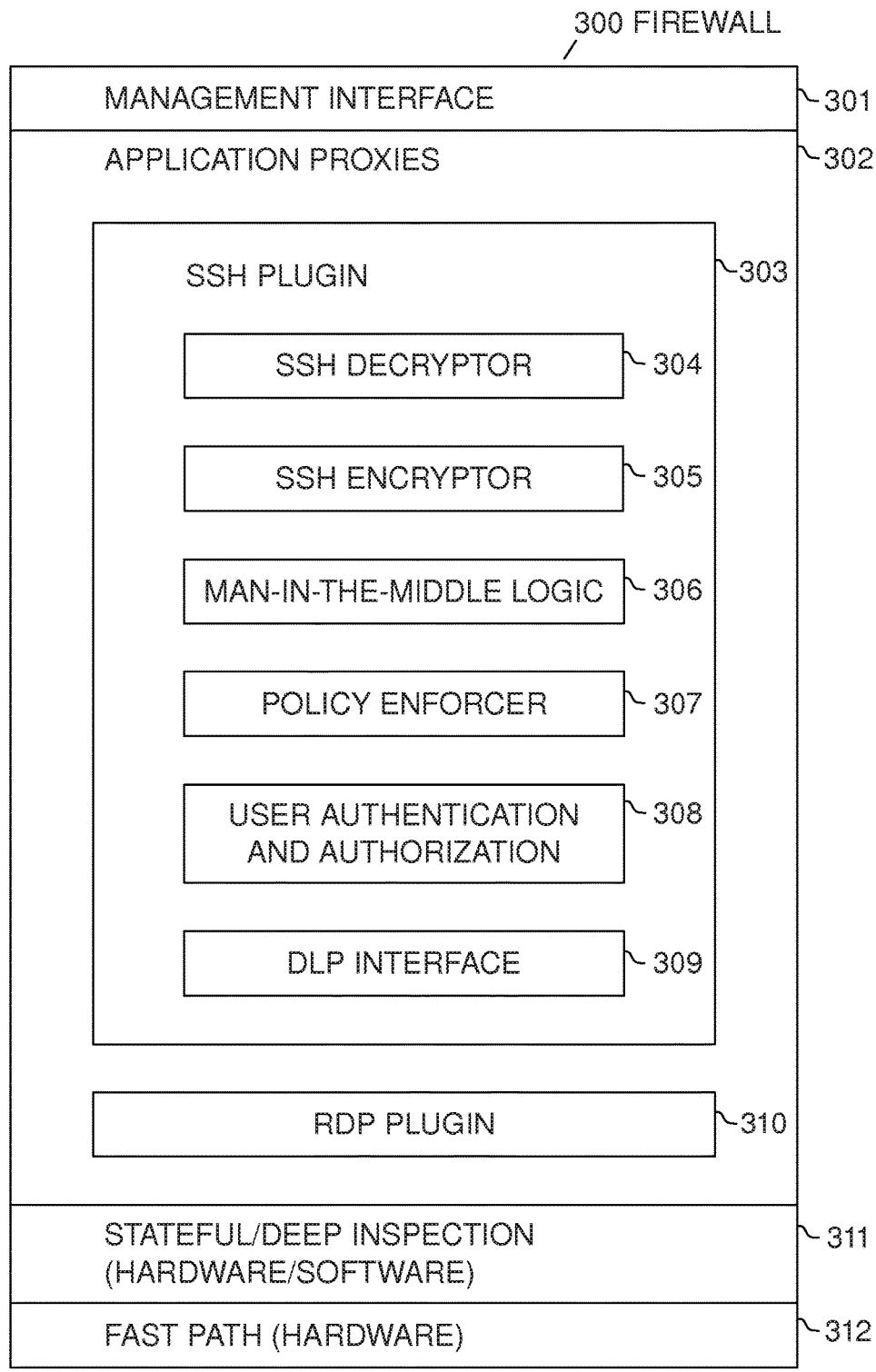
FIG. 3 illustrates a firewall embodiment of the invention in more detail.

FIG. 3 illustrates a firewall 300 in more detail. Generally, it is well known in the art how to build firewalls, as evidenced by the many firewall products that have been marketed over the last 15 years, including some open source ones, such as pfSense. For example, Juniper offers a line of service modules for its firewalls that can be used for implementing application proxies that intercept and modify data belonging to sessions. One way of implementing various embodiments is to build an application proxy (which may be installed in a commercial firewall), and vendor's development kits frequently contain sample source code that can be used as a basis for building a proxy. However, the invention may be embodied in any network device through which communication takes place for inspecting and controlling such communication, and may also be embedded within a network device or computer program product for inspecting and controlling traffic between that network device or computer program product for inspecting and controlling traffic between that network device or computer program product and an external network.

A firewall typically includes a management interface 301 that can be used, among other things, for loading and configuring application proxies (including defining firewall rules that direct certain protocols or TCP/IP ports to a particular proxy); one or more application proxies 302, some of which are provided by the firewall vendor and some of which may come from third parties and be installed on a firewall (e.g., using a Juniper service module on a Juniper firewall); stateful inspection hardware 311 (which may be implemented in software, or partly or fully in hardware, and which may also incorporate special hardware for, e.g., deep inspection using regular expressions); and a fast path 312 which represents logic for handling traffic for data streams that have already been authorized by the stateful inspection logic and is typically (but not necessarily) implemented in hardware.

A sample SSH proxy/plugin 303 is shown for capturing SSH connection. This is an example of an interceptor. The interceptor in this embodiment comprises an SSH decryptor 304, which implements logic for decrypting SSH sessions (example code for implementing this can be found in the open source OpenSSH program, which is currently at version 5.9); SSH encryptor 305, which implements logic for encrypting SSH sessions (example code for implementing this can also be found in OpenSSH); man-in-the-middle logic 306 for performing man-in-the-middle attack on SSH sessions (further described below); policy enforcer 307, which interprets policy (the policy can be advantageously delivered to the interceptor from an audit/policy server); user authentication and authorization component 308, which may check from, e.g., LDAP or Active Directory whether a user is authorized to connect to a particular service (though in some embodiments the authorization decision may be performed by the connected service, and in some embodiments delegated to an audit/policy server); and a DLP interface 309 for sending plaintext data from the session to a Data Loss Prevention server for determining whether the data can be transferred over the connection. Not all interceptors need to contain all of these components (and will contain other components not shown here, such as logic for sending audit data to an audit server).

There may also be other protocol proxies, such as an RDP proxy/plugin 310 for the Remote Desktop Protocol. Details of proxies for different protocols depend on the protocol, but generally would include decryptor, encryptor, and man-in-the-middle logic components for encrypted protocols, the policy enforcer component when policy decisions related to sessions for that protocol should be made, a user authentication/authorization component where the proxy controls which services a user may access, and a DLP interface if Data Loss Prevention is used (though DLP may also be implemented by sending the data to an audit server and having the audit server connect to a DLP system).

Figure 4:
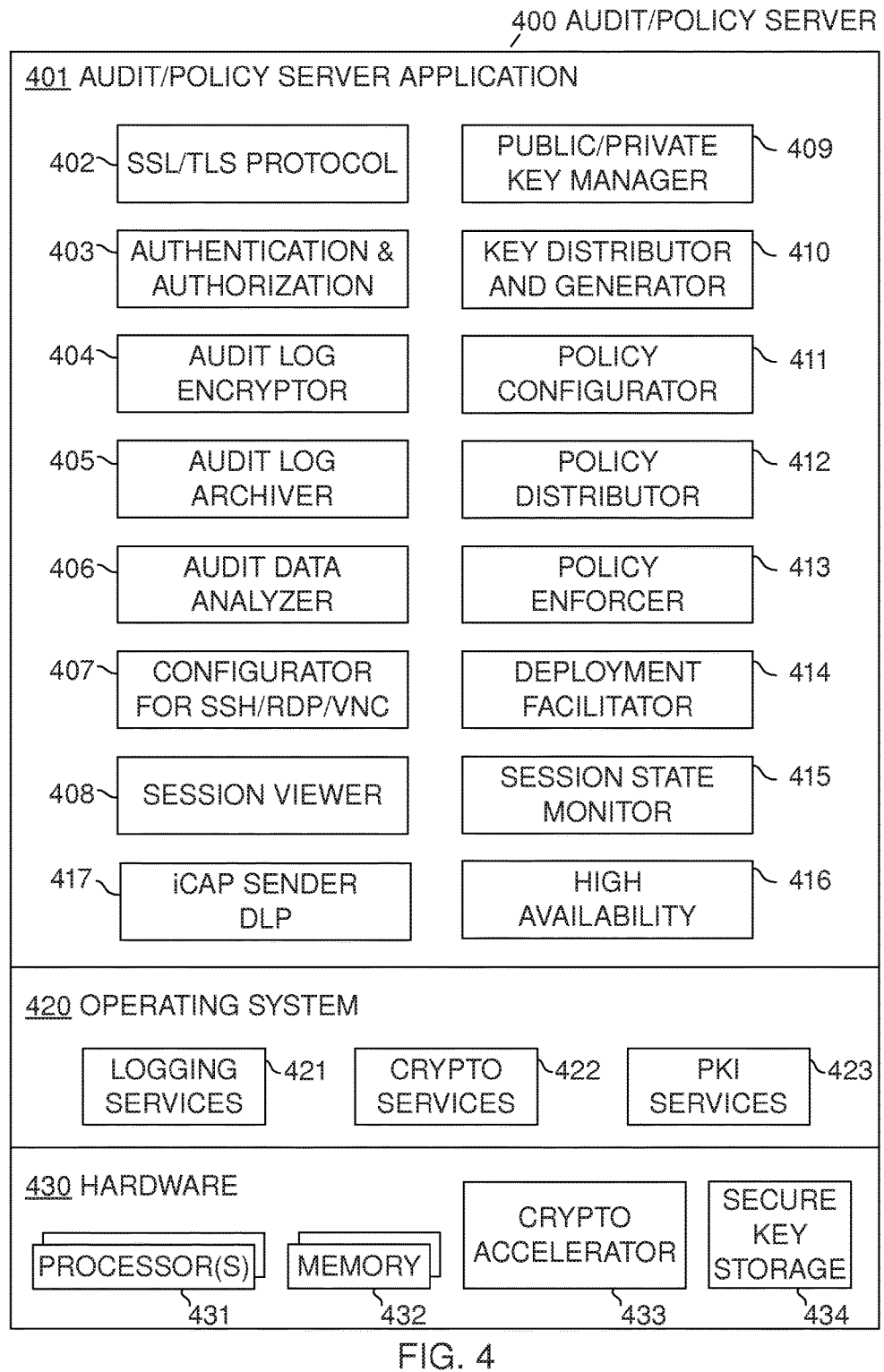
FIG. 4 illustrates the structure of an audit/policy server and/or a private key server in an embodiment (such servers may be separate servers or may be combined into one or more combined servers in various embodiments).

FIG. 4 illustrates a combined audit/policy/private key server 400 in an embodiment (its functionality may also be divided among multiple servers, and it may use, e.g., database servers and identity/authorization infrastructure servers). Such a server typically runs on a general purpose computer as an audit/policy server application 401, and the computer also includes an operating system 420 (e.g., Microsoft Windows or Unix/Linux), which typically provides logging services 421 such as syslog NG, crypto services 422, such as Microsoft Crypto API, and PKI services 423 (also often provided through Microsoft Crypto API or, e.g., the open source OpenSSL library), and hardware 430, which typically comprises one or more processors 431, one or more memory devices 432 (usually including both fast working memory such as DRAM, and non-volatile memory such as flash, magnetic disk, optical memory, or memristor arrays), crypto accelerator(s) 433 (such as the built-in AES accelerator in modern Intel processors or specialized cryptographic accelerator cards that are available from multiple vendors commercially) and secure key storage device(s) 434, which are often implemented using separate cryptographic accelerator cards when used. The hardware would typically also include one or more network interfaces, various buses and interfaces between processors and memory and I/O (such as PCI or USB). The computer may also access memory over networks or buses using suitable protocols, such as SCSI, iSCSI, CFS, or NFS. In general, any computer-readable memory may be used with the various aspects of the invention, regardless of the protocol or interface technology used for accessing it, except for transitory signals.

Within the audit/policy server application 401, there are typically many components. An audit/policy server may receive information from more than one interceptor. SSL/TLS protocol 402 may be used for the connection from interceptors to the audit server (though any other suitable cryptographic protocol could also be used, including SSH and IPSec). An authentication and authorization component 403 is used for authenticating users who use the audit server GUI (e.g., a web interface) to view audited sessions. It may also be used for authorizing individual sessions through interceptors if the interceptors have been configured to defer authorization decisions to the policy server. The audit log encryptor 404 is used for encrypting audit logs on the audit server, in order to make it more difficult to accidentally leak or compromise audit data. The audit log archiver 405 is used for recording audit logs on the audit server and for archiving session audit logs to archival storage after a while (e.g., after 30 days). It may, e.g., store the audit logs on a separate file server in encrypted form. It is also responsible for deleting audit logs after they are old enough, assuming they have not been marked for retention.

The audit data analyzer 406 comprises an indexing system and a string/regexp matcher (and/or other pattern matcher(s)) for detecting commands or other strings that may indicate suspicious activity (constraints configured for detecting such commands may involve, besides string matching, the user performing it, the related computers, applications executed, the script/command invoking the encrypted connection establishment, time, etc). It may also perform OCR (Optical Character Recognition) on audit data for RDP or other graphical protocols to allow string matching against displayed data. It may also index audit data for later searching (such index could be plaintext or encrypted; passwords would preferably not be included in an index for security reasons). Configurator for SSH/RDP/VNC 407 represents a component for managing client and server configurations for various protocols. Such management may include management of host keys for SSH, server certificates for RDP, etc. It may also include enabling key escrow functionality on servers and/or clients to enable faster capture. It may also cause an interceptor embedded within, e.g., SSH servers to perform auditing for selected sessions.

The session viewer 408 represents a user interface for viewing audited sessions. It may be implemented, e.g., as a Java application downloaded from the management interface, as a graphical application (e.g., for Windows) that communicates with the management server using a suitable protocol (e.g., HTTPS) to obtain an audit log (e.g., recorded session) and permit viewing it, or a video viewing element in a web user interface (implemented using, e.g., flash videos or HTML5 videos generated from a session and viewable through the user interface). The session viewer may permit searching session based on strings transferred, files accessed, hosts connected, time, etc. The session viewer may also be used in implementing 4-eyes monitoring, where a second administrator must monitor the actions performed by another in real time, with the ability to disconnect the session if some action is deemed inappropriate. In some embodiments, the entire user interface, including the session viewer, may be separated into one or more dedicated applications/servers (e.g., to limit the functionality performed on the performance-critical and security-critical audit servers).

The public/private key manager 409 handles private keys that the interceptors use for performing man-in-the-middle attacks transparently to users (it forms the core of what is elsewhere herein called the private key server). It may hold one or more private keys (possibly storing them in the secure key storage 434). Such keys could be host keys for hosts on which services that can be accessed run. Alternatively, they could be private keys for RDP or HTTPS. It would also be possible to have one private key that is shared among multiple services. The keys may be generated by the public/private key manager and distributed to clients and interceptors. Alternatively, they may be obtained from the hosts on which services run.

The public/private key manager may also act as a server for requests from interceptors for performing private key operations. It may perform such private key operations itself (after verifying that the request comes from a valid interceptor authorized to perform such requests—this could be checked, e.g., by the interceptor digitally signing the request using a key the audit server has generated for it, or using a shared secret to sign the request using a cryptographic hash function), possibly using the crypto services 422 and/or crypto accelerator 433. It may also forward the request to a host that has the private key for the destination host (typically the host running the service being connected to).

The key distributor and generator 410 takes care of generating key pairs and distributing them to hosts. In some embodiments, it may also generate host keys for managed SSH servers and send such host keys to both the servers and the clients (possibly through intermediaries).

The policy configurator 411 includes a user interface for configuring policies relating to which users can connect to which services (e.g., applications or computers) and what operations they can perform using such services. In some embodiments, the policies may be based on memberships of users in Active Directory groups, components of their distinguished names, etc. Computers and applications and groups relating to them may also be accessible from directories, and may be used in configuring the policy. Generally, it is known in the art how to implement such policies, as similar policy systems are used in many firewalls, intrusion detection systems, and, e.g., the known PowerBroker product (though for a somewhat different purpose). Here, the policy also controls which actions within protocol sessions are permitted (e.g., which files the user may access or whether port forwarding is allowed) and whether the session is to be recorded (audited), and if so, to what level of detail (e.g., all data, or just file names for transmitted files). The policy may thus reference plaintext (decrypted content) of the sessions and enforcement of policy rules may require access to the plaintext and may refer to data items only visible in the decrypted content, such as user names, transferred file names, transmitted data, or transmitted commands. The policy may also take into account the location of the client, the interceptor(s) through which it is transmitted, and the location of the server.

The policy distributor 412 distributes the policy, or some aspects of it, to the individual interceptors (whether in firewalls, SSH servers, or otherwise). The distributed policy may be the original policy in suitable encoding (e.g., ASCII file or ASN.1 encoded binary file). It may also be compiled into some kind of optimized filter code (which may be executable or interpreted data structures). The policy distributor preferably tracks which interceptors have already successfully received their policy, and retries transmitting the policy when it receives a connection from the interceptor, or tries to periodically push it to the interceptor until successful or the interceptor is removed from the system (e.g., by removing it through the administrative user interface).

The policy enforcer 413 enforces the policy with respect to a session. Such enforcement is in some embodiments done partially or fully by the interceptor, but in some other embodiments the interceptor may suspend the session and send a request to the policy server to make the policy decision. The policy server determines whether the operation in the session is to be allowed and delivers the result to the interceptor.

The deployment facilitator 414 handles enrollment of new interceptors and/or protocol servers (e.g., SSH servers) into the system. In one embodiment, each installed interceptor is provided with a shared secret (e.g., through a user interface in a firewall, SSHD configuration file, or by embedding it into the interceptor binary when downloading it from the audit server or other suitable server). When the interceptor first connects to the audit server, it authenticates itself using the shared secret (equivalently, it could be supplied with a private key and a digital signature could be used), and a new shared secret is negotiated (e.g., using the Diffie-Hellman protocol) or generated by the interceptor or the audit server and delivered to the other party encrypted (e.g., encrypting it using the shared secret or a session key generated using, e.g., Diffie-Hellman). Thereafter, the new shared secret is used for authenticating the interceptor to the audit server and, e.g., authorizing requests to perform a private key operation.

The session state monitor 415 tracks which sessions are active through any of the interceptors connected to the auditing system (in some embodiments, it may only track audited sessions). Advantageously, it also provides a user interface (e.g., web GUI) for displaying active connections and searching/sorting connections by user, host, application, protocol, firewall, location, etc.

The high availability component 416 implements high availability for the audit server using any known method for implementing high availability. It may select one of one or more audit servers for sending, and may switch to another audit server if one fails. In one embodiment, the audit server itself is stateless, and a distributed database is used for storing all state about active connections. interceptors communicate with the audit server using UDP (or open a new TCP connection if the old one gets disconnected). It is well known in the art of building web applications how to implement high availability using such stateless servers and a high-availability database (e.g., some versions of MySQL and Oracle support high availability). However, the server could also be implemented using stateful design, as is known in the art of designing network servers and web applications.

The iCAP sender or DLP (Data Loss Prevention) component 417 implements a Data Loss Prevention interface. It may operate in Detective Control mode, which provides visibility to what has been transferred, or Preventive Control mode, which can actually prevent disallowed data from getting out. In Preventive Control mode, the system generally buffers received data and holds it for a while, sends the data for DLP analysis (possibly using the iCAP protocol), and waits for the DLP subsystem to determine whether the data can be allowed to go through. The data is not actually sent to the other side of the control device until the DLP subsystem gives permission to do so. In Detective Control mode, data can be passed through immediately, but a copy of it is sent to the DLP subsystem for analysis. This allows higher performance and lower delays, but can only detect breaches after they have already occurred. The iCAP protocol is described in RFC 3507, which is hereby incorporated herein by reference (it is freely available for download from www.ietf.org). Other suitable protocols may also be used.

Figure 5:
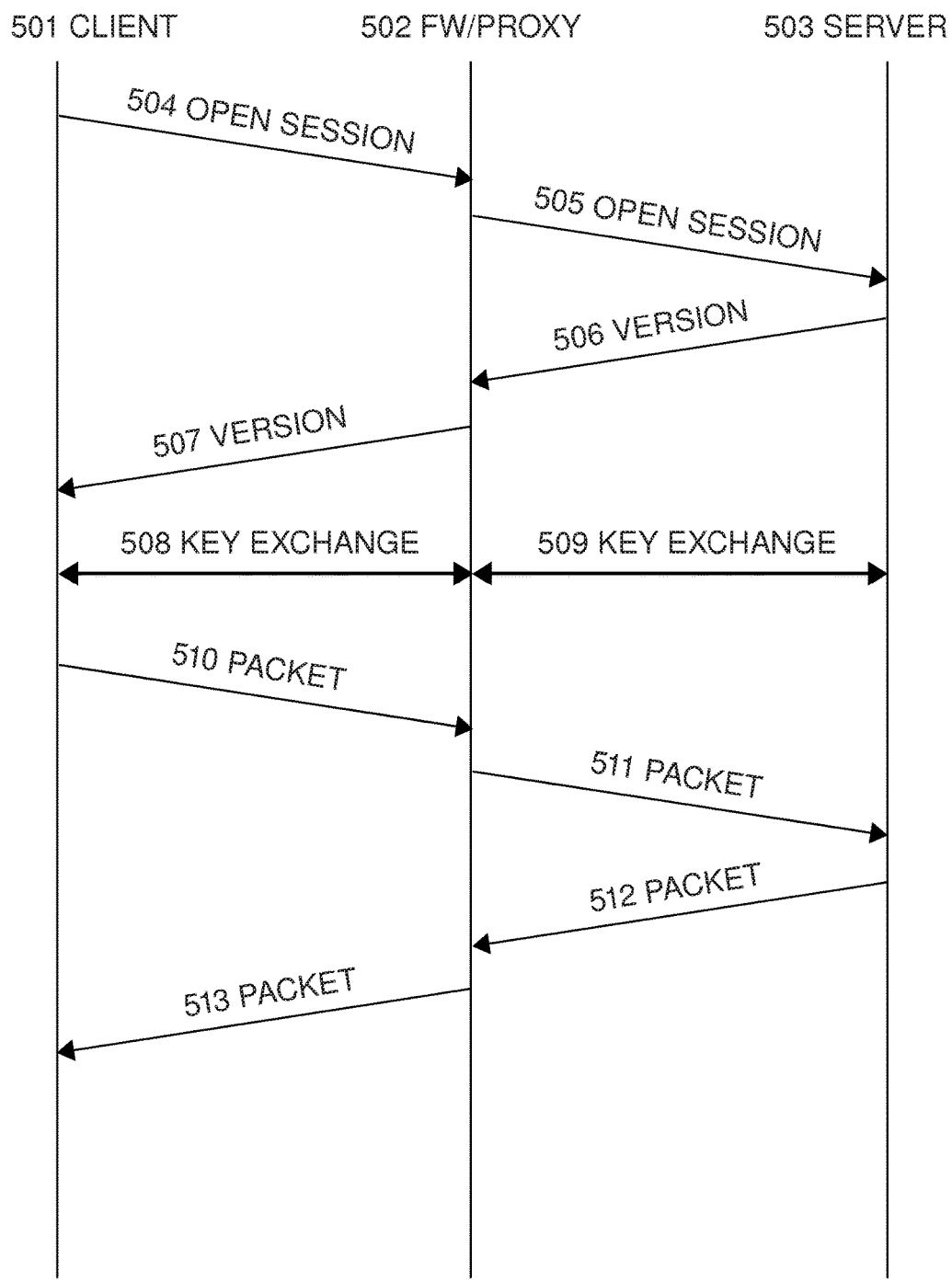
FIG. 5 is a packet diagram that illustrates the packet flow in an embodiment implementing man-in-the-middle attack for the SSH protocol.

FIG. 5 illustrates packet flow across the interceptor (FW/proxy 502) when a client 501 connects to a server 503 using the SSH protocol. First, the client opens a TCP connection to the server 504, which gets redirected by the firewall's application gateway functionality to the application proxy 502. The proxy then opens a TCP connection 505 to the destination host/server 503 (typically using functionality/APIs provided by the firewall). The server sends its version number 506 to the proxy, which forwards it to the client 507. Then, an SSH key exchange is performed between the client and the proxy 508, and another key exchange is performed between the proxy and the server 509 (these exchanges may occur simultaneously, or connecting to the server may be delayed until the key exchange between the client and the server has been completed and the client has authenticated to the proxy). During the exchanges, the client typically thinks it is communicating with the server. After the key exchange, when the client sends a packet to the server 510, the proxy normally forwards it to the server 511, and vice versa 512, 513. However, the proxy may inspect the packets and perform policy decisions on which operations are allowed. If it disallows an operation, it may, e.g., terminate the connections to the client and server, or synthesize a response to the request denying it (but otherwise allowing the connection to continue).

If either the client or the server is co-operating with the interceptor, they may use key escrow to the interceptor's key to disclose the session keys to the interceptor, allowing the interceptor (and/or the audit server) to decrypt the data without performing a man-in-the-middle attack. In one embodiment, using the SSH protocol, the interceptor inserts a specially formatted "IGNORE" packet in the packet stream going in each direction before the first "KEXINIT" packet. The IGNORE packet includes a magic cookie that permits a co-operating implementation to recognize it as indicating that an interceptor is present between the client and the server. This also permits the client to display a notice about auditing to the user, if appropriate. The IGNORE packet also contains a signature by the interceptor (by a key held by the interceptor) with a certificate indicating it as a valid interceptor signature in the organization, hash-signature using a shared secret held by the client and the audit server or interceptor (or some element that they can ask to sign the message). However, the signature is optional. Upon detecting such IGNORE message (and, if a signature is present, upon validating the signature), a co-operating client or server includes an IGNORE message just before taking the new keys into use, the IGNORE message containing the session keys (particularly the encryption keys, or at least an encryption key for one direction) or data from which the session keys can be derived for the session. The keys or related data should be encrypted before including it in the IGNORE message, such that only the interceptor (or the audit server, or other suitable secure process) can decrypt the data. One possibility is for each enterprise to have a key escrow key pair, where the private key is held by the audit server and the public key is distributed to all clients as part of their configuration. The client then encrypts the session keys/data using the public key, sends them to the interceptor in an IGNORE message that contains identification identifying it as a key escrow message and identifying the public key, the interceptor forwards the key escrow message to the audit server, the audit server decrypts/computes the session keys, and if the interceptor needs access to the keys (e.g., for making policy or authorization decisions), the audit server sends the keys to the interceptor over an encrypted channel that it has with the interceptor. The key escrow IGNORE message is re-sent during rekeying before taking the new keys into use.

Advantages of using this kind of co-operative key escrow over the known prior art include higher performance of the interceptor (it will not need to do man-in-the-middle attack, eliminating the need to have access to the service's private key and eliminating the need to re-encrypt the data with a different key to the destination host), and when policy decisions are delegated to the audit server, eliminating the need to decrypt the session in the interceptor entirely (the interceptor could then forward each packet to the audit server, and upon receiving permission from the audit server to forward the packet, forward it to the host at the other end of the connection).

Figure 6:
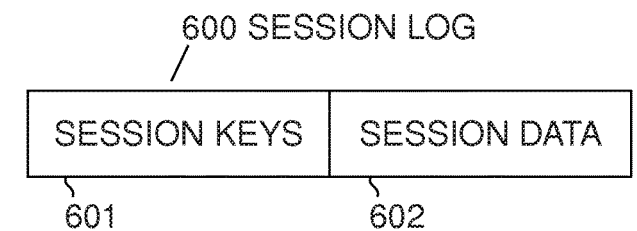
FIG. 6 illustrates advantageous packet formats in various embodiments of the invention.
Figure 6:
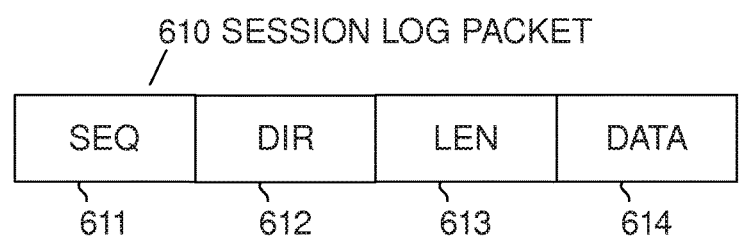
Figure 6:
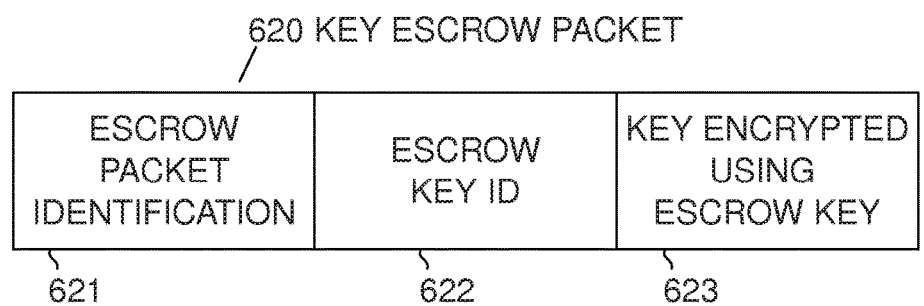

FIG. 6 illustrates various packet formats that may be used on the connection between the interceptor and the audit server and/or in recorded session logs on the audit server.

In one embodiment, a session recording (session log data) 600 comprises session keys 601 (preferably encrypted by a key encrypting key securely held within the audit server, or encrypted by a public key the private key to which is only accessible to personnel authorized to read audit logs) and encrypted session data 602 (which can be a simple recording of the entire session; however, with additional headers indicating the direction from which each packet or byte was received).

The session log packet 610 illustrates the layout of a packet in the session log in one embodiment. The sequence number 611 indicates the sequence number of the packet in the stream (the sequence number is used in the SSH protocol for authentication/encryption, but is only needed if not all packets are included in the session log—otherwise the sequence number is simply the packet's position in the stream for that direction). The direction 612 indicates whether the packet was received from the client or from the server. The length 613 indicates the number of bytes in the packet. The data 614 is the original packet (encrypted by the session keys). The original packet may or may not contain the message authentication code (including it may make non-repudiation possible, especially if a co-operating server or client escrows the MAC keys using a separate public key for which the private key is only available to a limited number of people doing non-repudiation checks).

The key escrow packet 620 illustrates a possible layout of an IGNORE message used for key escrow. The escrow packet identification 621 is a predetermined value used for identifying the packet as a key escrow packet. The escrow key id 622 identifies the public key that was used for encrypting the session key(s). It might be a copy of the public key, or some other identifier (e.g., small integer) understood by the audit server. The key encrypted using escrow key 623 is the key encrypted using the public key (or a random key encrypted by the public key followed by data encrypted by the random key, if the key/data is too long to be encrypted by the public key directly).

Figure 7:
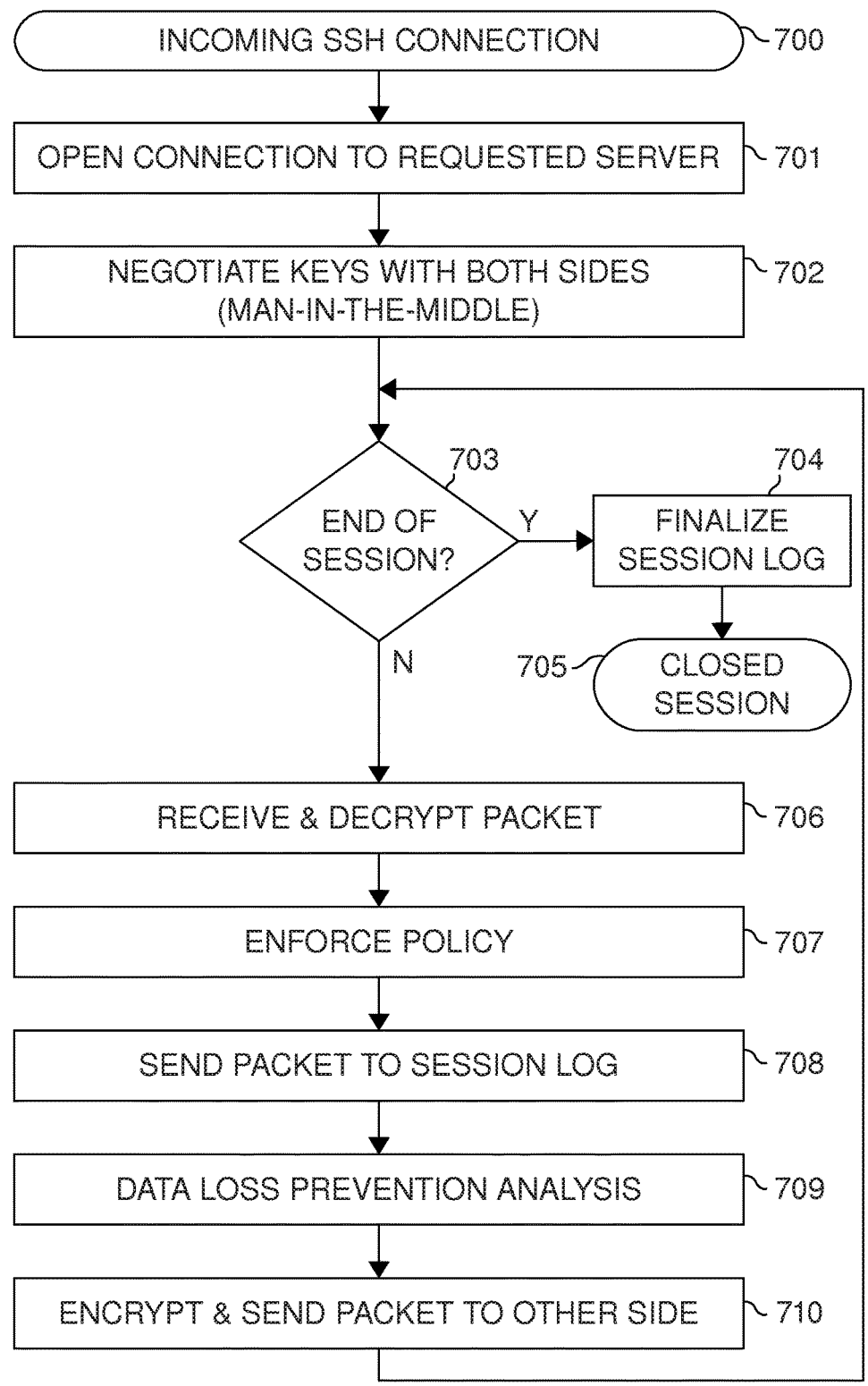
FIG. 7 illustrates a method for handling an SSH connection through an interceptor in an embodiment and performing policy enforcement, auditing (session logging), and data loss prevention (DLP) for it.

FIG. 7 illustrates processing an incoming connection by the interceptor in an embodiment. The processing begins when an incoming connection is received 700 (typically using the TCP/IP protocol). A connection is then opened to the destination server 701 (though in another embodiment connecting to the destination server might be delayed until the user making the connection has been authenticated to the interceptor). An SSH key negotiation according to the SSH protocol is then negotiated with both sides 702 (the host initiating the connection and the intended destination host). The intended destination host is usually identified by the destination IP address (e.g., if the interceptor runs as an application proxy in a firewall and captures connections as an intermediary), but could also be, e.g., preconfigured, passed as part of the user's name during user authentication (in this case, user authentication would be performed before connecting to the destination host), or in some other part of the exchange (e.g., as a message that is an extension to the current SSH protocol as standardized by the IETF).

After the above described steps, an SSH transport layer connection exists with both the initiating host and the destination host), and packets can be exchanged between the hosts, encrypted by the SSH protocol in accordance with the protocol specification. If end of session is detected 703, logging the session to a session log is finalized 704 (e.g., by sending a packet to the audit server indicating that the session has been closed) and processing for the incoming session is complete 705 and the session is now closed.

If more data is available for the session without encountering end of session, a packet is read from the connection (it may be received from either the initiating host or the destination host, and the source should preferably be recorded with the packet for later processing) and decrypted using the encryption keys negotiated with the side that sent the packet 706. Policy is then enforced on the packet 707 (e.g., checking whether the packet is a request to open a port forwarding connection, and if so, checking whether the request should be allowed according to the configured policy; if the request is to be denied, a response packet to that effect is constructed according to the SSH protocol and sent to the host that sent the request packet—or alternatively the session could be, e.g., disconnected, and/or the request could be logged and/or alerts triggered/generated using, e.g., SNMP traps, SMS text messages, and/or e-mail). If the packet is allowed, then execution continues from 708, and if session logging (recording) is enabled for the session, the packet is sent to the session log 708 (e.g., by sending it to the audit server using a connection that exists with the audit server). If the session is not logged, this step can be skipped. Then, the packet (or some content from it, possibly combined with content from other packets) is optionally sent to data loss prevention (DLP) analysis 709, e.g., using the iCAP protocol. The DLP system may respond by allowing the packet to pass through, or may deny sending the packet or, e.g., cause disconnecting the session.

The packet is then re-encrypted with the encryption and message authentication keys for the other host 710 (initiating host if the packet was originally received from the destination host, and vice versa).

Figure 8:
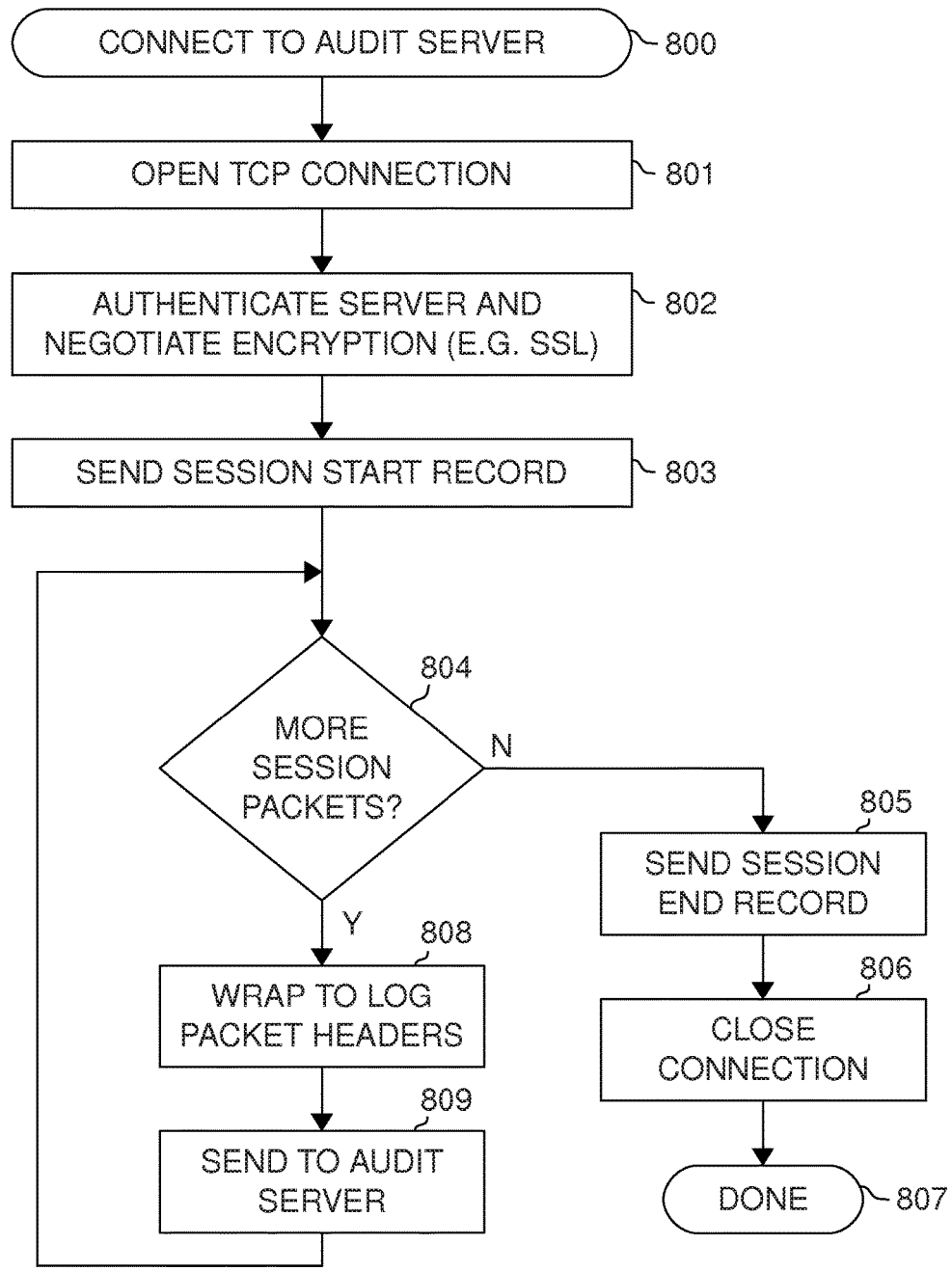
FIG. 8 illustrates a method for connecting to the audit server and sending session audit data to it in an embodiment.

FIG. 8 illustrates how an interceptor may send audit data about a session to an audit server in an embodiment. These actions would advantageously be performed in conjunction with processing an incoming session, though they could also be delayed, e.g., if the connection to the audit server cannot be made in real time when the session is opened or if log data is otherwise queued/buffered at an interceptor. Establishing a connection to an audit server begins at 800; this would typically take place when an incoming connection is received from a client when the connection has been authenticated, but could also be delayed. First, a connection is opened to the audit server 801, then encryption is negotiated with the audit server 802, using, e.g., the SSL, TLS, or SSH protocol (the encryption used could equivalently for the purposes described here be hard-coded or preconfigured). In the illustrated embodiment, these steps are performed once for each session, but it would also be possible for the interceptor to perform these steps only once, and perform the remaining steps 803-807 for each session, including an identifier for the session in the packets sent to the audit server where appropriate.

A session start record is sent to the audit server at 803. This record informs the audit server that a new session begins by sending them a session start record 803 and would typically identify the initiating and destination host IP addresses, and if user authentication has already been performed, the identity of the user, and possibly things like the requested service (these pieces of information could equivalently be sent using separate packets when they are available). The communication between the interceptor and audit server is encrypted using the negotiated encryption protocol.

As long as there are more session packets 804, a packet belonging to the audited session or some parts thereof are wrapped into log packet headers 808 and sent to the audit server 809 using the negotiated encryption protocol. The sent packet could contain decrypted plaintext data of the received packet (see 706), or could be the original received encrypted packet, or could be the encrypted packet sent to the other side in 710 (if it is an encrypted packet, the encryption keys or data for deriving them should be sent to the audit server at 803 or at some other time; in some embodiments, the key-related data could also be sent to and stored at a completely separate server for added security).

When no more packets are available for the session (end of the session has been reached), a session end record is sent to the audit server 805 using the negotiated encrypted protocol, the connection to the audit server is closed 806, and auditing the session is complete 807. (If multiple sessions are logged using the same connection to the audit server, then steps 806 and 807 would not normally be performed for every session.) The audit server could also be configured to automatically interpret a session as ending if connection to the interceptor is lost (TCP connection closed or time-outs).

Figure 9:
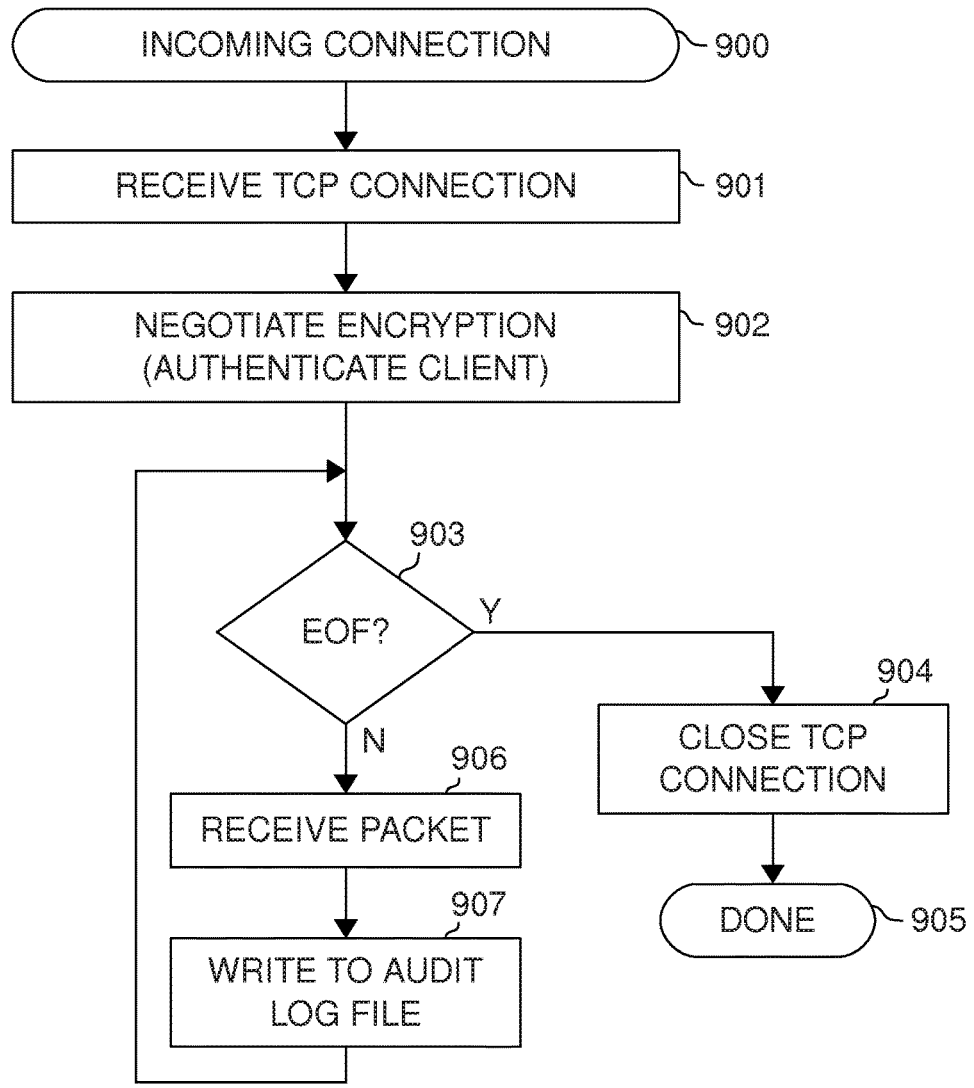
FIG. 9 illustrates auditing an RDP or HTTPS protocol connection in an embodiment without specific policy enforcement actions.

FIG. 9 illustrates processing an incoming connection 900 at an audit server in an embodiment. The connection is received at 901, and encryption is negotiated between the audit server and the interceptor 902, including authenticating the client (in this case, interceptor) to the audit server (e.g., by having each interceptor possess a private key used to sign a suitable value as part of the negotiation, and using a corresponding public key at the audit server to verify the signature—examples of a similar operation can be found from, e.g., the SSH protocol). If EOF is received 903 (end-of-file, or other indication that no more data will be forthcoming from the connection), the connection is closed 904 (recording end of session for non-closed sessions being audited through the connection in some embodiments, though in some other embodiments logging such sessions could continue using another connection) and handling the connection is complete 905.

If a packet is received from the connection 906, it is decrypted according to the negotiated encryption protocol, and the received packet is processed. Generally, the packet is written to an audit log file 907, but other processing could also take place in addition to or in place of the write—for example, a session start record could trigger opening a new audit log file.

In one embodiment, an SSH, RDP, VNC, HTTPS, or FTP/S session is captured by a plugin (application proxy) installed in a firewall. Many firewalls, including many Juniper models, allow new application proxies to be written by third parties and uploaded into the firewall through its administrative interfaces. The application proxy implements the interceptor as a software module. The interceptor is accompanied with configuration data, including the IP address of the audit server, information for authenticating the management server (e.g., shared secret, public key, certificate, or CA certificate of the manager), and policy configuration information received from the audit/policy server. In an embodiment, the interceptor is also accompanied by the private key corresponding to one or more SSH host keys, or SSL host certificate, and possibly by a certificate and/or public key corresponding to the private key.

The firewall is configured to direct one or more protocols (e.g., by TCP/IP port number) to the application proxy. The firewall redirects packets destined to a destination host to the application proxy, typically terminating the TCP/IP connection and connecting it to the proxy (even though the connection was destined to an IP address different from the firewall's address). The firewall may also open a TCP/IP connection to the destination host, or may leave it to the application proxy to open a connection to the destination host. Typically, the firewall would manipulate source IP addresses for the connection to the destination host so that it looks to the destination host as if the connection came from the initiating host. However, the firewall may also use its own address for the connection. Advantageously, the firewall makes the original initiator and destination IP addresses and port numbers available to the application proxy.

The firewall may also act as a NAT device or VPN gateway (using, e.g., the IPSec protocol—the IPSec protocol could also be used for securing any of the encrypted connections). Audit data from the interceptor is advantageously collected to an audit server that is not within the firewall; several firewalls (and other audit data sources) could audit to the same audit server. Many firewalls can operate in either bridged or routed mode.

Benefits of this embodiment over the prior art include the ability to handle pass-through traffic at the full speed supported by the firewall; the ability to install the interceptor remotely without requiring an administrator to go and physically install it on the boxes (in this case, hardware appliances); improved reliability because no additional devices will be required; ease of diagnosing problems because the person diagnosing the problem will only need to understand the firewall, not completely separate boxes; the ability to record sessions from multiple firewalls into a single audit data server for storage and analysis; the ability to operate non-intrusively, without changing what SSH/RDP/etc. clients end users/administrators use. Known prior art solutions require a special device or virtual machine to be added, through which all audited connections must be routed. No known prior art solution is able to collect audit data (e.g., session recordings) from multiple points into a single audit server. A single audit server is easier to secure, easier to back up and make fault-tolerant, and allows multiple entry points to an organization (firewalls) and internal access (via server auditing) to be consolidated into a single system for analysis, without requiring a security administrator to access potentially dozens of systems to find a particular session recording or check what sessions a particular user has had or who have accessed a particular service.

In one embodiment, the interceptor is implemented as part of an SSH (Secure Shell protocol) server (e.g., as an integral component built into the server or as a plugin or dynamically loadable library). When a connection arrives at the server, encryption is negotiated with the end host according to the SSH protocol. When packets are being sent, they are passed to the interceptor (essentially steps 706-709) before encrypting them, and received packets are decrypted, and then passed through the interceptor (essentially steps 706-709) before passing them to the rest of the SSH protocol code.

Parts of the interceptor could be integrated into other parts of the SSH server, such as making policy decisions regarding port forwarding in the code that handles port forwarding packets. Auditing of packets would most naturally be done between other packets and encryption/decryption as described above; however, it could also be done for the encrypted packet if the encryption keys or data for deriving them are made accessible to the audit server. DLP functionality could advantageously be implemented as part of the code that handles file transfers and/or the SFTP protocol.

In one embodiment, the interceptor is implemented as part of an SSH server, but is configured to audit data transmitted through a channel in the SSH channel protocol. One advantageous use of this configuration would be for auditing a forwarded RDP connection. In one embodiment, the SSH server is configured to audit a session (using any protocol that can be audited) transmitted using a channel in another SSH protocol session. Thus, auditing an SSH session inside another SSH session (possibly nested many times) could still be audited.

Benefits of implementing the interceptor in servers include the ability to audit sessions without installing any additional devices to the network and without modifying firewalls. Adding application proxies to firewalls may require authorization from a different group in an organization, which may sometimes be difficult to obtain from an organizational process standpoint and may thus be commercially important in enabling sale and deployment of product quicker. It also allows internal access which does not go through any firewalls to be audited, including access between virtual machines running on the same hardware in, e.g., a VMWare virtualization environment. No known prior art SSH auditing solution is able to perform the auditing directly in the server; however, some RDP servers have a feature for saving the contents of the session to a file. Even they are not known to be able to store such audit data centrally and/or in protected format on an audit server.

In one embodiment, the interceptor is implemented as part of an SSH client. Generally, the implementation in a client is quite analogous to the implementation in a server. The benefits are similar to the server case.

In one embodiment, the interceptor is implemented as part of a host-based firewall. The benefits are similar to implementing it in a physical firewall at a network boundary.

In one embodiment the SSH client and/or the SSH server escrows the session encryption key(s) to the interceptor that is in the middle of the network. The benefits of this embodiment include allowing auditing (session recording) to be performed without decrypting and re-encrypting the traffic (basically, without doing a man-in-the-middle attack). Benefits of this approach include higher performance of the interceptor (eliminating encryption/decryption there if no policy enforcement is required (potentially multiplying performance/throughput) and eliminating re-encryption if policy enforcement is needed (potentially almost doubling performance/throughput)).

In one embodiment, the man-in-the-middle attack is performed by terminating the SSH session initiated at the initiating host at the interceptor, and initializing an entirely new SSH session from the interceptor to the destination host. In this embodiment, data transmitted in various channels is buffered at the interceptor and re-packetized for transmission to the other side.

In one embodiment, the man-in-the-middle attack is performed without fully terminating the SSH session at the interceptor. Encryption is terminated at the interceptor, but the same packets are re-encrypted for the other side (with a different key). Channel windows of the SSH channel protocol are not terminated at the interceptor, but instead are end-to-end through it. There is no per-channel buffering of the channel data and no re-packetizing of the data. Nevertheless, the interceptor may refuse to forward some packets/requests to the other side and may instead reject some requests and send back a packet to that effect (as specified in the SSH protocol). Some packets/requests may be rejected by silently deleting them from the stream. Yet other packets/requests may be rejected by terminating the session.

In one embodiment, the vast majority of packets are transmitted through the interceptor without reconstructing the packets. Reconstructing means that new SSH packet headers are constructed for the packets or that data is re-packetized. Just decrypting and re-encrypting the same packet is not considered reconstructing. In one embodiment, more than 50% of all packets in a session are handled in man-in-the-middle capture without reconstructing the packets.

The benefits of performing the man-in-the-middle attack without fully terminating the SSH session at the interceptor over the prior art include higher performance and lower memory requirements (because no buffer memory and processing is required), which allows the same hardware to handle a much higher number of simultaneous connections and provide higher throughput (bits/second).

In one embodiment, the interceptor and the audit server reside on different hosts (physical or virtual hosts). Known prior art solutions store recorded sessions on the same hosts on which the capture is performed. The benefits of sending the audit data to a separate server include separation of functions as required by various security standards and regulations; the ability to collect audit data from multiple points into a single server for analysis and storage; offloading compute-intensive functionality from the interceptor (which may run in a firewall with limited or expensive computational resources) to one or more general purpose computers where computing resources are cheaper and more easily expandable; such offloading also allows better throughput and more connections through a firewall; the separation also makes it more difficult for administrators to subvert the system since they generally will not have access to the audit server and recorded sessions (or even the machine that contains them).

In one embodiment, the interceptor sends substantially all data exchanged in a session to an audit server in decrypted form (however, the transmission to the audit server uses an encrypting protocol for that connection). A benefit of this approach is that the audit server does not need to decrypt the session before analyzing it. In one embodiment, the audit server encrypts the received audit data using a special session recording encryption key, which is further encrypted by a key encrypting public key.

In one embodiment, an encoded policy is sent from an audit server or policy server to an interceptor. The policy may be, e.g., an ASCII file or a binary blob (e.g., using ASN.1 DER encoding) and may be digitally signed and/or encrypted. In one embodiment, the encoded policy is used by an interceptor in deciding whether a session or an action in a session is authorized. The policy could be structured as an ordered set of policy rules, similar to a firewall policy or IPSec security policy, specifying which hosts may connect. It may also contain more detailed policies, on per-host, per host-group, per-application, or default basis. Such detailed policies may describe, e.g., which port forwardings are permitted, which files may be accessed and how, or which commands may be executed in an interactive shell. It is generally well known in the art how to implement evaluation of a packet or request against such policy rules.

In one embodiment, the encoded policy limits which files can be accessed using SFTP or FTP/S protocol. In one embodiment, the policy contains one or more file paths or regular expressions that specify which files and/or directories can be accessed, and whenever a file is opened or created, it is checked whether the policy allows the named file to be accessed in the specified manner. The file name given in the request may be combined with the name of the current working directory before making the check. No prior art is known for controlling, using an interceptor, which files may be accessed in an SFTP or FTP/S session. The benefits of this embodiment over the prior art include the ability to control access to files at a firewall (or in an interceptor in a server) even for encrypted sessions. This increases the security of access to files, can provide an extra protection layer against accidental user or configuration errors, and allows improved control over which files each user can access.

In one embodiment, an interceptor requests a private key from a private key server/audit server in response to receiving a connection that uses a private host key for which the interceptor does not have the private key. In one embodiment the interceptor sends a request to the private key server, the private key server looks the key up from a database or requests it from another server, and sends the key to the interceptor. If the key is not available, an error notification is sent to the interceptor.

In one embodiment, a man-in-the-middle attack is performed without having a private key for the destination host (e.g., a private SSH host key or private key corresponding to an RDP certificate) at the interceptor. In this embodiment, when the interceptor needs to perform a man-in-the-middle attack for a session, it sends information relating to the session to a private key server/audit server, causing it to perform the private key operation on behalf of the interceptor and send the results back to the interceptor, and upon receiving the results of the cryptographic operation, performing the man-in-the-middle attack by the interceptor. In one embodiment, the private key server/audit server further sends the relevant information and the request to another host or application that has access to the relevant private key causing it to perform the cryptographic operation using the private key, sending the results to the private key server/audit server, which further sends them to the interceptor (the server could also send the result directly to the interceptor, and the audit server could direct the interceptor to contact the appropriate server for performing a cryptographic operation using a particular private key). The benefits of performing the man-in-the-middle attack without direct access to the private key include easier compliance with industry security standards such as PCI, some of which require that a private key may only be stored in one location; this unexpected benefit is not provided by any of the known prior art solutions.

In one embodiment, when an interceptor requests a private key or to perform a cryptographic operation using a private key, the interceptor signs the request using a private key enrolled for the interceptor when it was connected to the private key server and for which the audit server has the corresponding public key or certificate, and the audit server validates that the private key request comes from a valid interceptor by validating the signature. A shared secret or hash-based signature could also be used. A request from the private key server to another server may be similarly signed by the private key server (or the original signature may be forwarded).

In one embodiment, the interceptor sends data collected from one or more plaintext packets (decrypted packets or packets that have not yet been encrypted if capturing outgoing packets in SSH client or server), and sends it to a Data Loss Prevention (DLP) system using the iCAP protocol. In one embodiment, the interceptor waits for a response from the DLP system before allowing the data to be forwarded to the other side of the interceptor. In one embodiment, the request to transmit the data is rejected by synthesizing an error message in accordance with the protocol used for the session back to the requestor. In one embodiment, the session is terminated in response to a DLP system indicating that the data must not be transmitted. In one embodiment, a limited amount of data can be transmitted before waiting for a response to a DLP system. An advantage of sending data to the DLP system using the iCAP protocol over the prior art is that it permits the DLP system to reside in a remote location, and permits any iCAP-compliant DLP system to be used. An unexpected benefit of using iCAP from the interceptor for DLP is that it permits preventive DLP, i.e., the interceptor can wait until it receives permission from a DLP system before forwarding the data.

In one embodiment, the interceptor waits until it has received an entire file being transmitted, then sends it to a DLP system using the iCAP protocol, and in response to receiving a permission from a DLP system sends the file to the destination. In one embodiment, the session is suspended, then the iCAP request is sent, and upon receiving the response, the session is resumed (if action permitted), or a rejection response is sent, or the session is terminated based on the configured policy and the details of the response from the DLP system. In one embodiment, a cryptographic hash function of the file is computed before sending the file to a DLP system, and the hash function is used as a key to a cache data structure or database of files previously inspected using a DLP system, to avoid unnecessary re-inspection of a file that is transmitted multiple times across the interceptor (possibly to a different destination). A benefit over the prior art is that preventive DLP can be supported for entire file transfers. Equivalently, a different protocol for sending data to a DLP system and receiving an accept/deny type response (possibly with more nuances and/or additional information) could be used.

In one embodiment, the data is sent to an anti-virus system or malware checker instead of a DLP system, and the request to transfer the file is rejected if it contains malware or a virus. None of the known prior art solutions are able to prevent malware or a virus from being transferred, as they do not support suspending the session for the duration of the check and responding based on the results of the check. Caching could be used similarly as with DLP.

In one embodiment, the audit server sends data extracted from audit data packets received from an interceptor to a Data Loss Prevention system, and if the data loss prevention system informs the audit server that the action is not allowed, the audit server informs the interceptor that the action is not allowed. In one embodiment, this causes the interceptor to terminate the connection. In another embodiment, the interceptor suspends the session after sending audit data to the server until it receives a reply from the audit server, and depending on the type of the reply, resumes the session (by forwarding the packet to the other side with the proper encryption), terminates the session, or rejects the request. The benefits of doing DLP from the audit server in this manner include lower DLP system licensing costs (because only one host or a low number of audit server hosts will connect to the DLP server) and the ability to work around internal firewalls which might not permit all interceptors to connect to the DLP system (particularly when some interceptors reside in SSH servers in specially secured locations), improving the robustness of the solution and reducing customer support requests and costs.

In one embodiment, when policy, DLP, anti-virus, or malware prevention system rejects a request, an alert is triggered. Such alert may be triggered by, e.g., sending an SNMP trap to a network management system, ticketing system, or some other enterprise management system, by sending an SMS text message, by sending an e-mail, and/or in any other suitable manner known in the art. The session may also be flagged in the audit server as warranting special inspection and/or investigation. The flagging functionality provides the benefit of bringing suspicious sessions into the attention of the security administration, allowing suspicious behavior to be detected early, often before concrete damage is done.

In one embodiment, when a policy decision needs to be made on a packet in step 707, the interceptor suspends the session (or the channel to which the packet relates), sends information about the packet to the policy server so that the policy server can make a policy decision about the session, and upon receiving a response from the policy server, resumes the session, rejects the request, or terminates the session.

In one embodiment, the session is suspended by an interceptor after user authentication, and a request to authorize the session is sent to the audit/policy server. When the audit/policy server responds, the session is resumed or terminated depending on the response. The response may also include policy restrictions to be applied to the session. In one embodiment, the audit server adds the session to sessions requiring 4-eyes authorization and keeps the session suspended until another properly authorized user connects to the audit/policy server (directly or indirectly using suitable software, such as a web browser) and authorizes the session to continue. In one embodiment, the audit server displays a copy or near-realtime video of the session to the second user, permitting the second user to monitor the actions performed in the session. In another embodiment, the text of the "terminal" part of an SSH session is displayed, with links to transferred files and port forwarding data. In one embodiment, the second user has a button available for triggering immediate termination of the session (with optional immediate closing down of any access to the first user); in one embodiment, pressing this button causes a termination request to be sent from the audit/policy server to the interceptor, and upon receiving such termination request, the interceptor terminates the session in question. The termination request may include an identifier of the session. An unexpected benefit of suspending a session by an interceptor and sending the authorization request to the audit/policy server is that a single user interface can be used to authorize sessions regardless of which firewall, SSH server, or other interceptor captures the session. None of the known prior art provides this capability. In one embodiment, the connection to the destination host is not established until the session has been authorized. In one embodiment, the audit/policy server checks that the user approving the connection is a different user from the user that was authenticated. In one embodiment, the authorization request is sent already before user authentication.

In one embodiment, the interceptor adds a second (or additional) authentication method to authentication(s) otherwise performed by a server. For example, when a client connects from an external network through an interceptor (e.g., in a firewall), the session is connected to the destination host, and after the interceptor receives notification of successful authentication, the interceptor requests a second authentication from the client, and only reports successful authentication to the client if this second authentication is successful. In one embodiment, the interceptor receives the notification of successful authentication from the destination host, synthesizes a response requesting the desired type of additional authentication from the client, and only upon receiving proper response from the client sends the notification of successful authentication to the client. None of the known prior art does this. An unexpected benefit is that a second factor of authentication can be added by an interceptor without a reconfiguration of a server. The second factor could be, for example, SMS-based authentication or RSA SecurID authentication, and requiring it might depend on, e.g., which interceptor the connection goes through, the source IP address, and the time of the day.

Additional authentication may include one-time password authentication or some other form of challenge-response authentication. It may also include, e.g., Kerberos authentication for single sign-on. The interceptor may also fetch a password for the intended target account from a password vault or other service and provide the password from the interceptor to the destination endpoint.

In an embodiment, whether to permit access to a server depends on whether a valid ticket assigned to the user attempting access exists for the server in an enterprise IT ticketing system, change management system, or other system used for tracking IT tasks, approving them, and assigning them to system administrators for implementation. An interceptor may request a ticket number from an administrator, or may, in response to having authenticated an administrator, automatically fetch all tickets assigned to the administrator and check whether any of them permits access to the requested server. Alternatively, found tickets may be presented to the administrator in a user interface or menu for selecting one to be implemented. Furthermore, the actual end server to which the connection will be redirected may be selected based on servers indicated in the ticket, for example by automatically selecting the server indicated in the ticket, or if there are multiple servers indicated in the ticket, providing a means for selecting one of the servers, or possibly, connecting all indicated servers for performing operations on them in parallel.

In an embodiment, an interceptor is included in a gateway used for privileged access management. The gateway may provide, e.g., a web-based user interface (advantageously implemented using Javascript and HTML5) that implements a terminal emulator and/or RDP, VNC, and/or SSH clients, possibly with X11 emulation and the ability to use HTTP or HTTPS management interfaces through the gateway. The gateway requires authentication from the user, looks up tickets for the user, permits selecting a ticket from the tickets assigned to the user, and permits access to a server based on the user having a ticket assigned to a server. The gateway advantageously provides a temporary password for the server to the user or automatically authenticates the user to the server. The gateway also optionally allows access to a set of servers (configured, e.g., per user or per user group or globally) without an assigned ticket (e.g., the servers that a system administrator is primarily responsible for). The gateway also optionally allows access to a set of servers (configured, e.g., per user or per user group or globally) on an emergency basis based on configured policy rules, such as requiring a second user for a configured set of users to authorize and monitor the emergency session (similar to 4-eyes authorization). No man-in-the-middle attack is generally required in this kind of gateway implementation.

In one embodiment, an auditing system performs a man-in-the-middle attack on a cryptographic protocol (e.g., SSH, SSL, or TLS, possibly used for tunneling another protocol such as RDP (Windows Remote Desktop) or HTTP (for HTTPS)). While the auditing system is performing the man-in-the-middle attack and is required to use the private key of the original destination system of the protocol connection, it identifies the server to which the protocol session was targeted, identifies a computer that has access to the private key corresponding to a public key (advantageously embedded in an X.509 certificate for the destination) used for authenticating the server (advantageously this computer is the same computer as the destination server), and connects to that computer for performing a private key operation using the private key (the connection may be protected by a suitable cryptographic protocol, such as SSL, TLS, SSH, IPSec, or XMLSec). It causes that computer to perform a cryptographic operation required for successfully performing the man-in-the-middle attack. A computer having access to a private key does not necessarily mean being able to actually read the private key—it is enough for the computer to be able to perform the required operations using the private key; the key itself could be stored in, e.g., a hardware security module. In one embodiment, the access to the private key is facilitated by a software module (agent) installed on the destination computer. The software module may be provided on a computer readable memory accessible to the computer, and may, e.g., run as a service on that computer and may advantageously be integrated into an SSH server on that computer.

X.509 certificates are described in RFC 3280, "Internet X.509 Public Key Infrastructure Certificate and Certificate Revocation List (CRL) Profile", April 2002.

In an embodiment, the Kerberos protocol is used for authenticating hosts for SSH or some other encryption protocol. When Kerberos is used for host authentication, a host principal is defined in the Kerberos Key Distribution Center (KDC) (typically with a name like "host/hostname"), and a secret (credential) for obtaining a Ticket Granting Ticket (TGT) for the principal is stored in a keytab file on the host. When Kerberos is used for host authentication, the interceptor may be provided with the credentials for the host principal for one or more hosts that may be accessed through the interceptor. Advantageously, a private key server or an audit key server sends a copy of the host principal credentials to the interceptor, or allows the interceptor to request another device with access to the credentials to request a TGT that can be used for interception (such a TGT may be made forwardable or may be issued for the IP address of the interceptor). When a connection to an endpoint using Kerberos is intercepted, the interceptor obtains a ticket granting ticket (and/or other suitable Kerberos ticket(s)) for the host principal of the endpoint and uses them to authenticate to the originating endpoint as the destination endpoint.

In an embodiment, captured sessions are sent to a centralized storage server, or vault. The sessions are analyzed on the vault against a set of filtering rules. New filtering rules, potentially including new executable program code for analyzing the sessions, may be added to the vault without necessarily modifying any of the computer components (or more generally, the hosts or virtual machines containing/implementing the interceptors). The vault may also be extended in scope to cover multiple computers storing and/or analyzing sessions without modifying the interceptors. This is an unexpected benefit provided by having session logs from interceptors stored in a separate vault.

In one embodiment, the auditing system is used with a co-operating client and/or server. The protocol used between the client and the server may be the SSH protocol, but could also be, e.g., the SSL protocol. The auditing system has one or more cryptographic keys (public-private key pairs or symmetric encryption keys) that it can use for key escrow between a co-operating client and/or server and an auditing system. During the connection, the client and/or server include(s) sufficient data in the protocol connection to enable the interceptor to decrypt the session. In one embodiment, the data comprises an identification of the escrow key used and enough information for decrypting the session provided the decryptor is in possession of the key used for the escrow. In one embodiment, the escrow key is a public-private key pair, with the public key accessible to the client and/or server, and the private key accessible to the auditing system (the interceptor capturing the connection between the client/server, and/or the audit server, and/or a separate computer capable of performing a decryption operation using the private key). Using (access to) the private escrow key, the interceptor decrypts the connection without performing a man-in-the-middle attack on the connection. In one advantageous variation, the interceptor uses the escrow data to decrypt the session for inspection, but sends the original encrypted packet through the interceptor without re-encrypting it, reducing processing overhead. In one embodiment, the interceptor does not even decrypt the session (and need not itself have access to the escrow data, though advantageously can recognize that the audit server does have access to it and performs a full man-in-the-middle attack if it does not), but just sends a copy of the session to the audit server (including the escrow data). The audit server then decrypts the session based on its configured policy.

In one embodiment, the operation of the interceptor depends on policy information provided by the audit/policy server. In one advantageous embodiment, the interceptor caches a policy decision, and reuses the previously made decision based on cached information when a compatible (e.g., the same) decision needs to be made in the future. In one embodiment, the data is flushed from the cache after a given time period; in another embodiment, the data is flushed when the audit server notifies the interceptor that the policy has changed.

In one embodiment, an interceptor is configured with more than one audit/policy/private key server IP address. The interceptor attempts to connect to one of the configured audit server IP addresses. In response to the connection attempt failing, the interceptor tries to connect to another one of the configured audit server addresses, and repeatedly attempts connections to the configured addresses until a connection succeeds.

In one embodiment, an interceptor or an audit server deletes user passwords from the audit data before storing the audit data in long-term storage (long-term storage meaning storage where the data will be kept for hours or days, typically non-volatile magnetic disk with present technology). In one embodiment, the management system indexes the contents of a session, but the password(s) are not included in the index. Generally, substantially all data of a session does not necessarily include passwords transmitted within the session.

In one embodiment, the audit server causes OCR (Optical Character Recognition) to be performed for an RDP session (or other graphical session, such as X11 session or some other remote desktop protocol session). In one embodiment, the OCR is performed essentially immediately when the session data is captured (essentially immediately here meaning approximately within one minute—in any case potentially before the session is terminated if the session is of long duration). In one embodiment, the text resulting from OCR is subjected to indexing for later content-based searches and analysis. In one embodiment, the text is sent to a Data Loss Prevention system (e.g., using the iCAP protocol). In another embodiment, the text is analyzed using one or more analysis algorithms (possibly based on configurable policy), and an alert (e.g., SMS, e-mail, triggered action) is generated in response to an analysis result.

In one embodiment, the interceptor performs a man-in-the-middle attack on a cryptographic protocol session embedded within another cryptographic protocol session. For example, the SSH protocol allows TCP/IP ports/connections to be forwarded within an encrypted tunnel, and other cryptographic sessions (e.g., SSH, SSL, TLS) can be embedded within forwarded connections. The interceptor decrypts the outer cryptographic protocol using a man-in-the-middle attack, and by inspecting data inside the outer protocol determines that a connection is/may be tunneled. Upon detecting (or being configured to assume) that the embedded connection contains a cryptographic protocol connection, it performs a man-in-the-middle attack on the inner connection. This process may be nested for an arbitrary number of layers. Instead of a man-in-the-middle attack the escrow method described above may alternatively be used for the outer and/or the inner connection(s).

In one embodiment, configured policy information specifies that only some files can be transferred across a cryptographic connection (e.g., an SSH+SFTP connection or FTP/S (SSL+FTP) connection). An interceptor (and/or an audit server) decrypts the cryptographic protocol layer(s) and analyzes the file transfer protocol (e.g., SFTP or FTP) inside the cryptographic layer to determine which directories are being accessed and/or which files (or path names) are being transferred. It compares the directories and/or file/path names against the configured policy. Based on the configured policy and the match of the names against it, it determines the action to perform. For example, the policy may permit files in a certain directory to be read and all other operations to be denied. If the file path matches the permitted directory, the request is permitted and passed through the interceptor (or regenerated for the other side). If it does not match, the request is not passed through, but instead a failure response is generated and sent to the side originating the request. The policy may also specify that the connection should be disconnected (and potentially other actions taken, such as the access closed for the user account used for authenticating the connection).

An aspect of the invention is auditing a connection only once even if it goes through more than one interceptor. In one embodiment, the interceptor sends to the audit server (or other suitable server) the source IP, source port, destination IP, and destination port of the connection. The audit server checks if it is already auditing a connection with the same IP addresses and port numbers. If so, it tells the second (and third, and so on) interceptor not to audit that connection. Otherwise it tells the interceptor to audit it. In one embodiment, it still causes the interceptor to audit the connection if more than a predetermined time has elapsed since the original connection was opened or if the new connection comes from the same interceptor that was previously auditing that connection. In one embodiment, it closes the previous auditing connection and audits the new connection as an extension to the previous connection (possibly auditing it in the same file or otherwise as part of the same session as the previous connection).

In one embodiment, the contents of one or more transferred files are copied to and stored on an audit server. In one embodiment, the audit server has a database mapping cryptographic hashes of the contents of files to locations of previously stored file contents. When a file is to be audited, a cryptographic hash of the file contents is computed, a lookup is made to the database using the hash value, and only a reference to the file (e.g., the hash value) is stored in the audit log. In one embodiment, the interceptor computes the hash of the file, sends the hash (or information derived from it) to the audit server, the audit server performs a lookup from its database using the sent information, and responds to the interceptor informing it whether it should send the full contents of the file to the audit server. In response, the interceptor either sends or does not send the full contents. In one embodiment, the database also contains information about whether the file has previously passed DLP (or anti-virus or other suitable checks), and in response to the information indicating that the file is acceptable for DLP or other checks, the interceptor skips performing DLP or other similar checks on the file again.

In one embodiment, an audit system co-operates with a key management system for SSH host keys, SSL server keys/certificates, and/or another keys. When a private key operation needs to be performed, the audit system connects to the key management system and causes the key management system (or a host managed by it) to perform a private key operation needed for performing a man-in-the-middle attack on a cryptographic session.

In one embodiment, when the user has been successfully authenticated but before confirming authentication to the client, the interceptor sends an authorization request to the audit server (or other suitable server) with an identification of the user and optionally data about where the user connects from, and/or details about the user's client (e.g., version number and vendor).

Many variations of the above described embodiments will be available to one skilled in the art. In particular, some operations could be reordered, combined, or interleaved, or executed in parallel, and many of the data structures could be implemented differently. When one element, step, or object is specified, in many cases several elements, steps, or objects could equivalently occur. Steps in flowcharts could be implemented, e.g., as state machine states, logic circuits, or optics in hardware components, as instructions, subprograms, or processes executed by a processor, or a combination of these and other techniques.

It is to be understood that the aspects and embodiments of the invention described in this specification may be used in any combination with each other. Several of the aspects and embodiments may be combined together to form a further embodiment of the invention, and not all features, elements, or characteristics of an embodiment necessarily appear in other embodiments. A method, an apparatus, or a computer program product which is an aspect of the invention may comprise any number of the embodiments or elements of the invention described in this specification. Separate references to "an embodiment" or "one embodiment" refer to particular embodiments or classes of embodiments (possibly different embodiments in each case), not necessarily all possible embodiments of the invention. The subject matter described herein is provided by way of illustration only and should not be construed as limiting.

In this specification, selecting has its ordinary meaning, with the extension that selecting from just one alternative means taking that alternative (i.e., the only possible choice), and selecting from no alternatives either returns a "no selection" indicator (such as a NULL pointer), triggers an error (e.g., a "throw" in Lisp or "exception" in Java), or returns a default value, as is appropriate in each embodiment.

A computer may be any general or special purpose computer, workstation, server, laptop, handheld device, smartphone, wearable computer, embedded computer, a system of computers (e.g., a computer cluster, possibly comprising many racks of computing nodes), distributed computer, computerized control system, processor, or other similar apparatus capable of performing data processing. A computing system is a computer or a group of connected computers, such as the computers within an enterprise, or elements thereof.

Computer program code means computer executable or interpretable instructions for causing a computer to perform various actions as determined (in part) by the computer program code. Computer program code may be, e.g., directly executable processor instructions, byte code for execution by a byte code interpreter or emulator, byte code that is compiled into machine-executable instructions (e.g., by a Java Just-On-Time compiler), or source code that is interpretable and/or compilable as machine instructions for controlling a computer (e.g., Python or Tcl code).

A firewall is a computing device that monitors and/or restricts communications between network segments or hosts. Firewalls are frequently installed at the boundaries of an organization's internal network (e.g., at Internet connection points). Sometimes firewalls are also used for dividing the internal network into segments between which traffic is controlled (e.g., to protect critical servers or to establish a DMZ (Demilitarized Zone) for externally visible servers). A firewall may be a stand-alone device, may be integrated into another device (e.g., router or ADSL modem), and may comprise multiple co-operating computers, possibly in a fault-tolerant configuration. A firewall may also be understood as the overall system of elements for establishing a security perimeter, including, e.g., a packet filter ("traditional firewall"), anti-virus detection gateway, DLP (Data Loss Prevention) gateway, IPS (Intrusion Prevention System) or IDS (Intrusion Detection System), traffic recorder for recording data packets going across the firewall for, e.g., forensics purposes, auditing system (for recording access to some or all user accounts), VPN (Virtual Private Network) gateway, etc. A firewall as a whole is usually a kind of computer and may comprise (more restricted) computers as components. Some firewalls are software components that are installed in a computer in addition to its other software (often called host-based firewalls).

A plugin is a software module that can be installed into a larger software system (possibly embedded in a hardware product) in order to extend or modify the functionality of the larger software system, such as by adding support for an additional protocol or file format. Many software packages provide well-defined APIs and installation mechanisms for such software components.

Plaintext (also called cleartext) means the plain (unencrypted) version of some encrypted data, as opposed to ciphertext, the encrypted version. Usually the plaintext can be obtained from the ciphertext by decrypting the ciphertext using a cipher and a decryption key. The exact relationship between the plaintext and ciphertext depends on the encryption method and protocol involved; sometimes it is more complex than just decryption. See, e.g., the SSH protocol specification for examples. Access to the plaintext of an encrypted connection may be provided, e.g., by storing the connection in decrypted (plaintext) format, storing the decryption key (and other related information, such as the cipher name) with the original encrypted data, or by decrypting the original encrypted session into plaintext, and then encrypting it using another key which is then stored in addition to the newly encrypted data (permitting access to the plaintext by decrypting the newly encrypted data using this key). The decryption key might be stored directly or, e.g., encrypted by another key (such as encrypted using a public key, so that it can only be decrypted using a corresponding private key). The encryption key could also be stored using a secret sharing scheme, such as the Shamir or Blakley methods. With secret sharing, access to the decryption key could be made to depend on having K of N secrets (e.g., requiring at least three people out of five to co-operate).

Substantially all plaintext of a connection means access to one or more of: all plaintext of a connection; all plaintext except passwords and other security-sensitive data; substantially all plaintext of a connection in one direction. When a connection may also be used for transferring files or other attachments, substantially all plaintext does not necessarily include such attachments.

Access to the plaintext of an encrypted communication is effective if the plaintext or substantial portions of it or substantial amounts of information derived from it (such text obtained from the graphical content of a session using OCR) can be determined with a reasonable computational effort (computations taking a few seconds or even a few minutes being reasonable effort in many applications, but computations taking many years clearly not being reasonable). Brute force decryption of modern encryption systems clearly does not provide effective access. An amount of information about a session is substantial if it represents at least 5% of the information content of the session. Protocol overhead (such as packet headers carrying only control information for the session) are not counted in information content. For graphical communications displaying text (e.g., RDP session), access to 5% of the text displayed using the graphical communication represents a substantial portion, regardless of the number of bits transmitted relative to the number of characters represented. A communication can comprise multiple packets exchanged in each direction between communicating endpoints (the endpoints being computing devices, programs, or program objects such as TCP/IP sockets therein).

A policy server may cause a communication to be captured by an interceptor (e.g., by configuring the interceptor, or configuring a firewall or a network tap device or other suitable component external to the interceptor to cause the communication to be transmitted to the capture interceptor).

A policy server may cause the interceptor to perform man-in-the-middle attack on certain communications based on a policy it sends to an interceptor. In a man-in-the-middle attack, the interceptor establishes a first set of encryption keys with a first endpoint and the interceptor and a second set of encryption keys with the interceptor and a second endpoint.

A policy (and indirectly the policy server) may cause an interceptor to transmit information obtained using the man-in-the-middle attack (including session metadata and/or part or all of decrypted content) to an audit server. Whether to transmit information may be determined by an interceptor based on the policy and/or the decrypted content of the communication.

Generally anything the interceptor does may be at least partially caused by a configured policy (and therefore a policy server).

An interceptor may cause a policy server to record information by sending the information to it for recording.

A component implemented in software can cause an operation to be performed, e.g., by making a function call to a function that performs the operation or sending a remote procedure call (RPC) or other protocol request to perform the operation to another computing device over a network.

Computer-readable media includes any non-transitory media that can be read by a computer, such as computer-readable magnetic data storage media (e.g., floppies, disk drives, tapes), computer-readable optical data storage media (e.g., disks, tapes, holograms, crystals, strips), semiconductor memories (such as flash memory, memristor memory, and various ROM and RAM technologies), media accessible through an I/O bus and/or interface in a computer, media accessible through a network interface in a computer, and networked servers from which data can be read by another computer.

In an embodiment, a computer may provides a computer program product that is an embodiment of the invention for downloading by clients, such as web browsers, over a network protocol such as HTTP, FTP, or a peer-to-peer protocol.

In an embodiment, a computing device comprises a downloading server (e.g., a web server) that provides a computer program product that is an embodiment for downloading over a data communications network.

What is claimed is:

1. A method comprising:
    receiving, in a firewall from a policy server, policy information including instructions for interception of encrypted communications;
    intercepting and decrypting, in the firewall at least a part of an encrypted communication, at a packets level, according to a first encrypted protocol in accordance with the policy information; and
    sending at least a part of the decrypted communication from the firewall to an audit server using a network protocol,
    wherein the firewall is a device that performs stateful inspection of data packets, and
    wherein the audit server is not within the firewall.

2. The method of claim 1, wherein the first encrypted protocol is the Secure Shell (SSH) protocol, the Virtual Network Computing (VNC) protocol, or the Remote Desktop Protocol (RDP) protocol.

3. The method of claim 1, further comprising:
    intercepting a sent packet belonging to the communication before it is encrypted by the firewall; and
    intercepting a received packet belonging to the communication after it has been decrypted by the firewall.

4. The method of claim 1, further comprising:
    making a policy decision about whether to allow a port forwarding request.

5. The method of claim 1, further comprising:
    deciding whether to allow an intercepted protocol operation based on a policy rule received from the policy server, where the protocol operation is selected from the group consisting of: opening a port forwarding channel, opening a session channel, transferring a file, opening a file, creating a file, modifying a file, reading a file, removing a file, renaming a file, advertising a device, opening a device, advertising a printer, and opening a printer.

6. The method of claim 1, further comprising:
    intercepting a request to transfer data using the first encrypted protocol and accepting or rejecting the request based on a response from a data loss prevention (DLP) system to a query about the data.

7. A firewall comprising:
    one or more processors; and
    at least one non-transitory memory comprising program code for causing, with the one or more processors, the firewall to:
    receive, from a policy server, policy information including instructions for interception of encrypted communications;
    intercept and decrypt at least a part of an encrypted communication, at a packets level, according to a first encrypted protocol in accordance with the policy information; and
    send at least a part of the decrypted communication to an audit server using a network protocol,
    wherein the firewall is a device that performs stateful inspection of data packets, and
    wherein the audit server is not within the firewall.

8. The firewall of claim 7, wherein the at least one memory further comprises program code for causing the firewall to:
    intercept a sent packet belonging to the communication before it is encrypted by the firewall; and
    intercept a received packet belonging to the communication after it has been decrypted by the firewall.

9. The firewall of claim 7, wherein the at least one memory further comprises program code for causing the firewall to:
    decide whether to allow an intercepted operation defined in the first encrypted protocol based on policy received from the policy server.

10. The firewall of claim 7, wherein the at least one memory further comprises program code for causing the firewall to:
    block a request to transfer data using the first encrypted protocol in response to data loss prevention system (DLP) identifying the data as data whose transfer is not allowed.

11. A computer program product for a firewall stored on a non-transitory computer-readable medium comprising program code operable to cause the firewall to:
    receive, from a policy server, policy information including instructions for interception of encrypted communications;

intercept and decrypt at least a part of an encrypted communication, at a packets level, according to a first encrypted protocol in accordance with the policy information; and send at least a part of the decrypted communication to an audit server using a network protocol, wherein the firewall is a device that performs stateful inspection of data packets, and wherein the audit server is not within the firewall.

12. The computer program product of claim 11, wherein the first encrypted protocol is the Secure Shell (SSH) protocol.

13. The computer program product of claim 11, wherein the first encrypted protocol is the Remote Desktop Protocol (RDP).

14. The computer program product of claim 11, further comprising program code operable to cause the firewall to:

intercept a sent packet belonging to the communication before it is encrypted by the server; and intercept a received packet belonging to the communication after it has been decrypted by the server.

15. The computer program product of claim 11, further comprising program code operable to cause the firewall to:

make a policy decision about whether to allow a request defined in the first encrypted protocol.

16. The computer program code of claim 11, further comprising program code operable to cause the computer to act as a server for Secure Shell (SSH) connection, and send information related to the Secure Shell connection to the audit server in plaintext.

17. The computer program code of claim 11, further comprising program code operable to cause the computer to act as a client for Secure Shell (SSH) connection, and send information related to the Secure Shell connection to the audit server in plaintext.

\* \* \* \* \*